United States Patent
Peterson et al.

(10) Patent No.: US 8,037,423 B2
(45) Date of Patent: Oct. 11, 2011

(54) APPARATUS, METHOD AND COMPUTER-READABLE MEDIUM FOR ORGANIZING THE DISPLAY OF VISUAL ICONS ASSOCIATED WITH INFORMATION TECHNOLOGY PROCESSES

(75) Inventors: Harold Lee Peterson, Scotts Valley, CA (US); Nick Labosky, San Jose, CA (US)

(73) Assignee: Digital Delivery Networks, Inc.

( * ) Notice: Subject to any disclaimer, the term of this patent is extended or adjusted under 35 U.S.C. 154(b) by 147 days.

(21) Appl. No.: 11/528,952

(22) Filed: Sep. 27, 2006

(65) Prior Publication Data

US 2008/0077873 A1    Mar. 27, 2008

(51) Int. Cl.
*G06F 3/048* (2006.01)
(52) U.S. Cl. ......... 715/835; 715/810
(58) Field of Classification Search ......... 715/810, 715/835
See application file for complete search history.

(56) References Cited

U.S. PATENT DOCUMENTS

| | | | |
|---|---|---|---|
| 6,141,003 A * | 10/2000 | Chor et al. ......... 715/719 |
| 6,148,286 A * | 11/2000 | Siegel ......... 704/270 |
| 6,211,858 B1 * | 4/2001 | Moon et al. ......... 715/771 |
| 6,239,798 B1 * | 5/2001 | Ludolph et al. ......... 715/788 |
| 6,297,818 B1 | 10/2001 | Ulrich et al. |
| 6,961,945 B2 | 11/2005 | Stall |
| 7,146,573 B2 | 12/2006 | Brown et al. |
| 2002/0054176 A1 | 5/2002 | Ulrich et al. |
| 2002/0091739 A1 * | 7/2002 | Ferlitsch et al. ......... 707/526 |
| 2002/0138331 A1 * | 9/2002 | Hosea et al. ......... 705/10 |
| 2002/0174230 A1 * | 11/2002 | Gudorf et al. ......... 709/227 |
| 2004/0070605 A1 * | 4/2004 | Huang et al. ......... 345/744 |
| 2006/0242584 A1 | 10/2006 | Johanson et al. |

\* cited by examiner

*Primary Examiner* — William L Bashore
*Assistant Examiner* — David Phantana Angkool
(74) *Attorney, Agent, or Firm* — Patrick Reilly

(57) ABSTRACT

A method, system and computer-readable medium are provided for enabling the organization, presentation and selection of icons related to information technology processes. In a first version, icons related to individual information technology processes are associated with an enclosing icon displayed by a computer. The user may direct the computer to display or cease displaying the icons by selecting the enclosing icon. In a second version the enclosing icon may be associated with another enclosing icon, wherein icons are organized into a presentation hierarchy. In a third version, the icons may be personalized by associating textual, graphical and/or photographic data as provided by the user.

21 Claims, 18 Drawing Sheets

APPARATUS, METHOD AND COMPUTER-READABLE MEDIUM FOR ORGANIZING THE DISPLAY OF VISUAL ICONS ASSOCIATED WITH INFORMATION TECHNOLOGY PROCESSES

FIELD OF THE INVENTION

The present invention relates generally to methods and systems for managing the selection and initiation of information technology processes by a computer system, and more particularly, to a user interface system and method that enables a user to selectably direct a computer system to display icons used to initiate software processes and/or Internet services.

BACKGROUND OF THE INVENTION

Many corporations that market their goods and services to consumer and other mass markets attempt to create on-going relationships with their customers and the public. In particular, corporations that supply information technology systems and services often desire to create and expand an awareness of users of computer systems of the corporate identity supplying the instant system or service. Yet consumers are increasingly bombarded with advertising and brand messaging. In addition, computer users typically prefer to maintain simplicity in the visual layout of the user interface presented on a display device of a computer.

A user interface bridges the gap between a user who seeks to control a device and the software and/or hardware that actually controls that device. The user interface for a computer is typically a software program running on the computers central processing unit (hereafter "CPU") which responds to certain user-typed commands. As computers have increased in popularity, the quality of the user interlace has become an ever more important consideration in the development of a computer, since many of these users are not familiar with and/or comfortable with many of the typed commands that are required to operate the computer. One popular type of user interface that simplifies the operation of a computer is provided by a VAIO FS8900™ notebook computer marketed by Sony Corporation of America, of New York City, N.Y. Other prior art personal computers known in the art may comprise user interfaces integrated with or within an XP™ or VISTA™ personal computer operating system marketed by Microsoft Corporation of Redmond, Wash. Other popular types of user interface are include in Macintosh computers marketed by Apple Computer, Inc., of Cupertino, Calif.

Certain prior art computer user interfaces employ what is referred to as a desktop metaphor for the basis of its user interface. Through use of a point and select device, such as a mouse or trackball, in communication with the computer, the user can select and/or move certain conic objects on the screen of the computer to control its operation. The desktop metaphor refers to the fact that: (1) the screen of the computer often looks somewhat like the blotter of a desktop, with a menu bar across the top of the blotter from which the user can select various control features; (2) there may be a trash can icon in the lower right hand corner of the blotter which can be used to remove items from the computer; and (3) programs and documents created with the software programs or services provided in synergy with a computer network are represented by iconic images of pages which can be placed in iconic images of folders and arranged on the blotter for easy access and organization, like the files of a filing cabinet in an office. The prior art teaches that these icons can be arranged— on the screen in a number of different manners, such as according to their type, size and color, and the user can search for files by searching for words listed in the title bar associated with each icon.

The prior art fails, however, to provide an apparatus, method or computer-readable medium that enables a presentation of a single enclosing icon that may be selected by a user to, upon selection by the user, display a plurality of process icons, and wherein the enclosing icon may present a signage to the user that is related to a corporate identity. There is, therefore, a long felt need to enable providers and marketers of information technology products and services to maintain a visual perceived image related to a corporate identity by means of a user interface of a computer.

SUMMARY OF THE INVENTION

Towards this object, and other objects that will be made obvious in light of the present disclosure, a method is provided for selectably presenting icons related to information technology processes by means of a computer system, wherein the computer system has a display screen and a point and select device. In a first preferred embodiment of the method of the present invention, or first method, the first method includes generating an enclosing icon on the display screen, wherein the enclosing icon presents a signage related to a corporate identity.

In one exemplary preferred embodiment of the method of the present invention, a corporation, such as a computational device manufacturer, may reinforce brand awareness with a user of a computer by maintaining and providing a useful organizing utility and wherein the visual aspect of this utility comprises a signage that may be trademarked and/or copyrighted and further associated with the corporation by advertising and other promotional means and methods.

In accordance with the first method, a user of the computer system may use the enclosing icon for alternatively and selectably instantiating a first enclosing state and a presenting state. The first method may further include (a.) displaying the enclosing icon in the enclosing state upon start up of the computational device and until the enclosing icon is selected; and (b.) displaying the enclosing icon in the presenting state and at least two process icons upon selection of the enclosing icon by means of the point and select device, wherein each process icon initiates a unique information technology process when selected by means of the point and select device.

The first method may further include one or more of the following aspects or steps:

a. adding user personalized information, e.g., visually imagery or representations of textual information, to the signage of the enclosing icon;
b. collecting user personalized information by an intelligent client executable by the computer system;
c. initiating at least one information technology process upon selection of the associated process icon by means of the point and select device.
d. Presenting an icon associated with an one information technology process selected from the group of information technology processes that include a web based service, an Internet service, a web browser, a word processor, an address book, a calendar, an email client, and a visual image presenter;
e. receiving an update information related to a unique informational technology process associated with at least one process icon;

f. logging an update information in an update listing via an intelligent client executable by means of the computer system;

g. associating an update listing with at least one process icon via the intelligent client executable, and displaying the associated process icon concurrently with the display of the enclosing icon in the presenting state; and h. executing at least one command associated with an update information after selection of the update information from an update listing.

Certain alternate preferred embodiments of the method of the present invention provide an apparatus for enabling selection and initiation of information technology processes by a computer, the computer including a display and a point and select device with which a user selects an icon visually presented on the display. The apparatus may comprise (1.) a memory that stores an enclosing icon software, a plurality of icon software and a plurality of application programs; (2.) an enclosing icon software including signage information; (3.) at least two icon software modules, each module associated in a one-to-one correspondence with a unique information technology process; and (4.) a display logic coupled with, and/or partially or fully comprised within, the display. The display logic is configured for drawing icons on the display, wherein at system start-up the display logic instantiates an enclosing state icon and renders a signage derived from the enclosing icon software, and upon selection of the enclosing state icon by the point and select device the display logic instantiates a presenting state icon and the signage derived from the enclosing icon software and a plurality of process icons derived from the plurality of icon software.

Certain still alternate preferred embodiments of the method of the present invention provide a computer readable medium comprising machine readable instructions which direct a computational device to implement the actions of (1.) generating an enclosing icon, the enclosing icon presenting a signage, and the enclosing icon for alternatively and selectably instantiating a first enclosing state and a presenting state; (2.) displaying the enclosing icon in the enclosing state upon start up of the computational device and until the enclosing icon is selected; and (3.) displaying the enclosing icon in the presenting state and at least two process icons upon selection of the enclosing icon, wherein each process icon is associated with a unique information technology process.

In certain yet other alternate preferred embodiments of the method of the present invention a software program enables a user to generate one or more additional enclosing icons, wherein a computer maintains two or more enclosing icons and each icon may be personalized in functionality, content and/or appearance. In one exemplary embodiment, a computer may be used to generate plurality of enclosing icons wherein each enclosing icon is personalized to at least one user, whereby functionalities enabled by means of each enclosing icon may be unique.

The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which.

DETAILED DESCRIPTION OF A PREFERRED EMBODIMENT

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Figure 1:
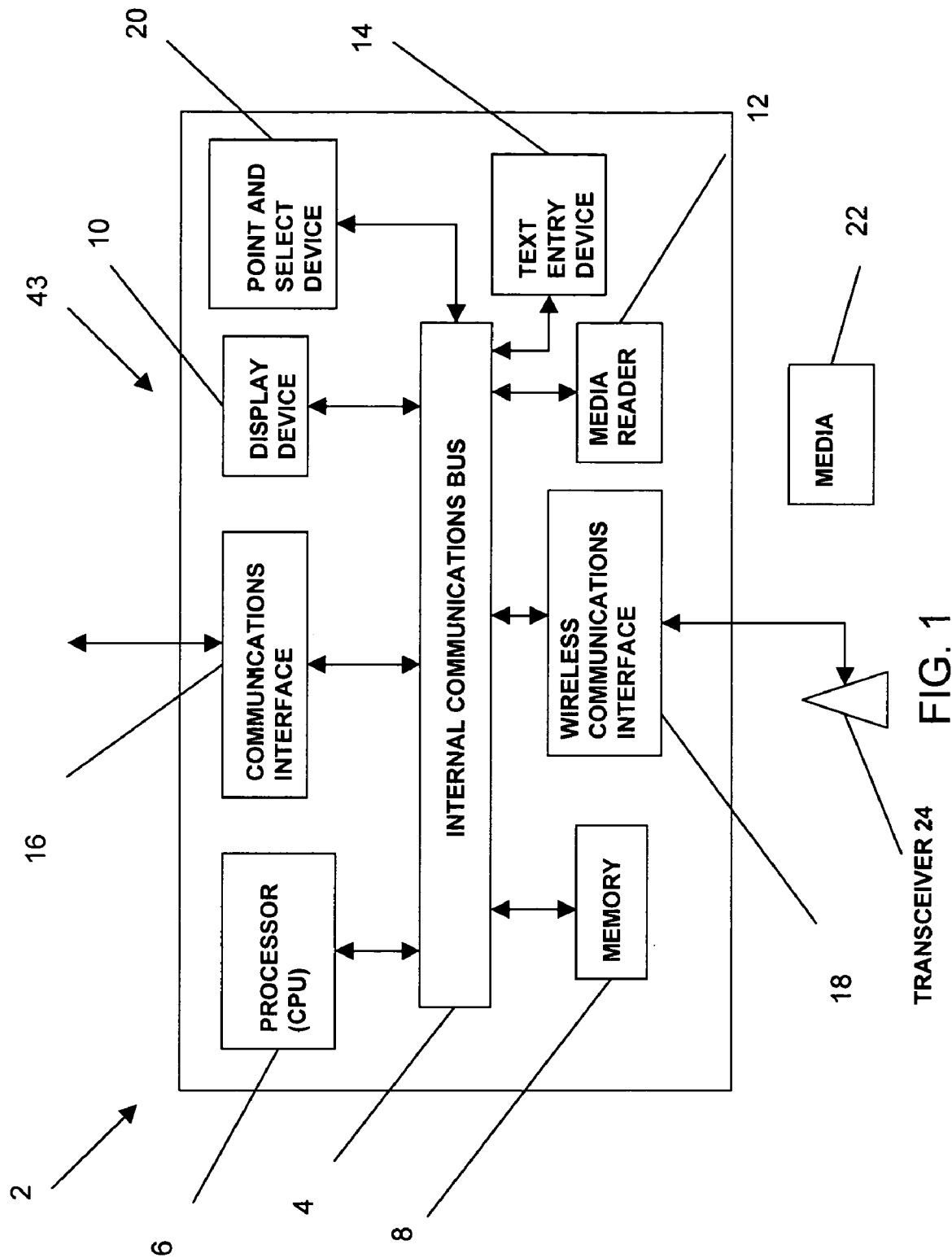
FIG. 1 is a schematic diagram of a computer system by which the first method may be instantiated.

Referring now generally to the Figures and particularly to FIG. 1, FIG. 1 is a schematic diagram of a computer system 2 by which the first method may be instantiated. The computer system 2 may be a personal computer, such as (a.) a VAIO FS8900™ notebook computer marketed by Sony Corporation of America, of New York City, N.Y., (b.) an Apple Mac Book Pro™ personal computer, or (c.) other suitable computational system known in the art, and configured for wireless and/or landline connectivity with the Internet and/or the world wide web and optionally having Bluetooth wireless communications functionality. The computer system 2, or computer 2, includes an internal communications bus 4 that bi-directionally couples a central processing unit 6, a memory 8, a display device 10, a media reader 12, a text entry device 14, a network communications interface 16, and/or a wireless communications interface 18. The internal communications bus 4 additionally communicatively couples a point and select device 20 with the central processing unit 6 (hereafter "CPU" 6).

A user may communicate commands, selections and information to the computer 2 by means of the point and select device 20 and the text entry device 14. In certain other alternate preferred embodiments of the present invention the point and select device 20 may be or comprise a computer mouse such as (a.) a Targus™ Bluetooth capable computer mouse coupled with a AdapterspacerVS-AMBOIUS™ Bluetooth adapter, (b.) Apple Mighty Mouse™ computer mouse, (c.) an Apple Wireless Mouse™ computer mouse, or (d.) other suitable computer mouse or other suitable icon selection device known in the art configured to enable a user to select an icon as presented on a visual display device 10 of the computer 2. In certain still alternate preferred embodiments of the present invention the text entry device 14 may be or comprise a computer keyboard peripheral, such as an Apple Wireless Keyboard™, or other suitable keyboards known in the art and configured to enable a user to provide text input to the computer 2. In certain yet other alternate preferred embodiments of the present invention the display device 10 may be or comprise a touch screen module whereby the user may communicate commands, selections and information to the computer 2 by manually or physically pressing against a touch sensitive of a display surface of the display device 10.

The CPU 6 may include an on-chip and or on off-chip cache memory that increases the processing effectiveness of the CPU 6 in executing and running information technology processes. The media reader 12 is configured to read computer-readable and machine executable instructions stored in a computer-readable medium 22 and transmit the read instructions to the CPU 6 and the memory 8.

The term "computer-readable medium" as used herein refers to any suitable medium known in the art that participates in providing instructions to the network for execution. Such a medium may take many forms, including but not limited to, non-volatile media, volatile media, and transmission media. Non-volatile media includes, for example, optical or magnetic disks, tapes and thumb drives. Volatile media includes dynamic memory. Transmission media 10 includes coaxial cables, copper wire and fiber optics. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, RAM, a PROM, and EPROM, a FLASH-EPROM, any other memory chip or cartridge, a carrier wave as described hereinafter, or any other suitable medium known in the art from which a computer can read machine executable instructions.

Various forms of computer readable media may be involved in carrying one or more sequences of one or more instructions to the network for execution. For example, the instructions may initially be carried on a magnetic disk of a remote computer. The remote computer can load the instructions into its dynamic solid-state electronic memory 8 and send the instructions over a telephone line using a modem. A modem local to or communicatively linked with the network can receive the data on the telephone line and use an infra-red transmitter to convert the data to an infra-red signal. An infra-red detector can receive the data carried in the infra-red signal and appropriate circuitry can provide the data to the network.

The memory 8 both stores software instructions needed by the CPU 6, and the computer 2, to execute and instantiate the commands, processes and actions described herein, and provides these software encoded instructions via the internal communications bus 4 to the CPU 6 and generally within the computer 2. The software instructions stored and provided by the memory 8 may be, comprise, or be comprised within a web based service software, an Internet service software, a web browser software, a word processor software, an address book software, a calendar software, an email client software, and a visual image presenter software. It is understood that the computer 2 may partially or fully execute or instantiate an information technology process, e.g., a software program, a web based service, and an Internet based service in accordance with a software instruction sequence that is partially stored, instantiated and/or executed outside of the computer 2.

The communications interface 16 may comprise a modem configured to enable connectivity between the computer 2 and the Internet 26 (as per FIG. 2) and/or a computer network 28 (as per FIG. 2) via a landline connection of a telephony network.

The wireless communications interface 18 is paired and configured to bi-directionally communicatively couple the computer 2 to a communications network 30 via the wireless transceiver 24.

Figure 2:
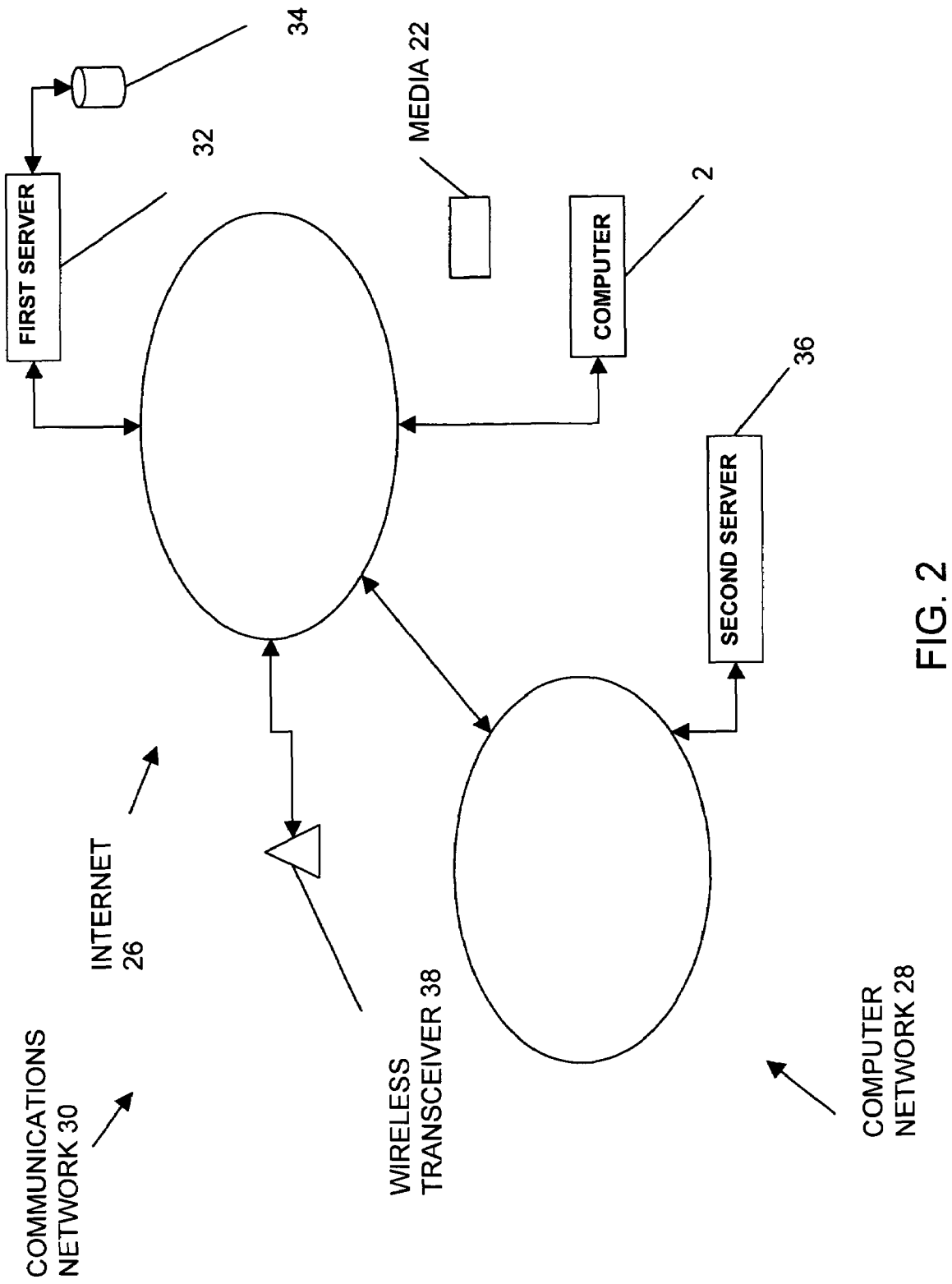
FIG. 2 is a schematic diagram presenting an electronic communications network that includes the computer system of FIG. 1.

Referring now generally to the Figures and particularly to FIG. 2, FIG. 2 is a schematic diagram presenting an electronic communications network 30 that includes the computer system 2 of FIG. 1 within the Internet 26. The electronic communications network 30 may be or comprise the Internet 26, the computer network 28, a telephony network, a wireless communications network and/or other suitable electronic communications equipment and systems known in the art. A first server 32 is comprised within the Internet 26 and is configured to bi-directionally communicative with the computer 2. The computer 2 and the first server 32 are each assigned a unique and distinguishable network address in accordance with the Transmission Control Protocol and Internet Protocol. The first server 32 is configured to provide, and provides, a web service, and/or other suitable Internet service known in the art, to the computer 2. A database 34 of the first server 32 stores information related to the provided web service and may optionally enable at least partial access to this information and other information to the computer 2. The computer 2 includes a web browser and an email client that may be used to harvest and deliver information, commands and selections to the first server 32.

A second server 36 is comprised within the computer network 28 and is bi-directionally communicatively coupled with the Internet 26 (to include computer 2) by means of the computer network 28. The second server 36 is configured to provide, and provides, an information technology functionality, and/or other suitable information technology service known in the art, to the computer 2.

A wireless transceiver 38 is comprised within the Internet 26 and is configured, tuned and paired to enable bi-directional communications between the computer 2 and the first server 32 and the second server 36 by means of the electronic communications network 30 and the transceiver 24 and the wireless communications interface 18.

In certain alternate preferred embodiments of the method of the present invention, the computer 2 may be an isolated computational system, having no communicative coupling with either any electronic communications network 26 28 & 30 nor any other computational devices 32 & 36.

Figure 3:
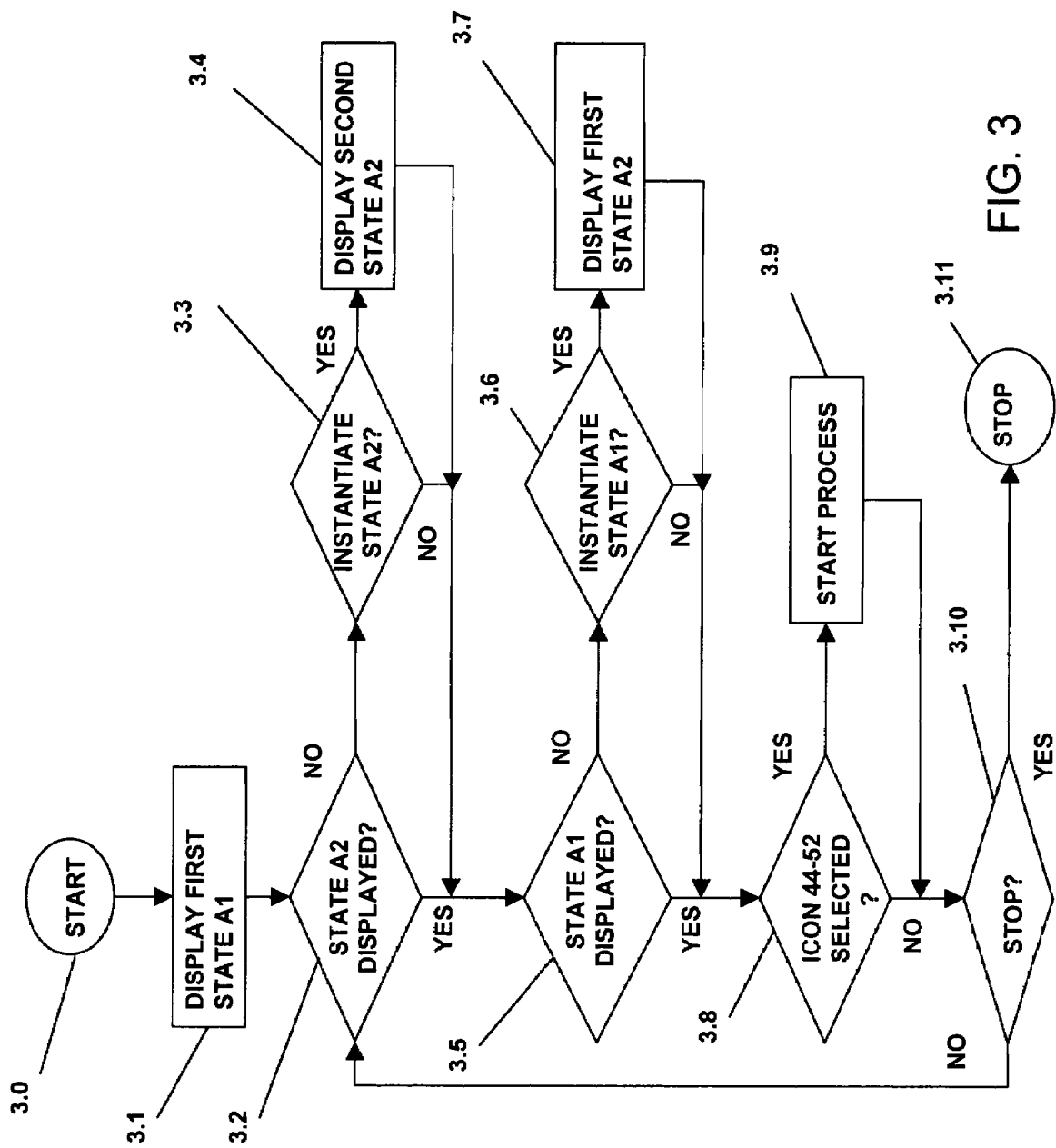
FIG. 3 is a flow chart of the first method that may be executed by means of the electronic communications network of FIG. 2.
Figure 6:
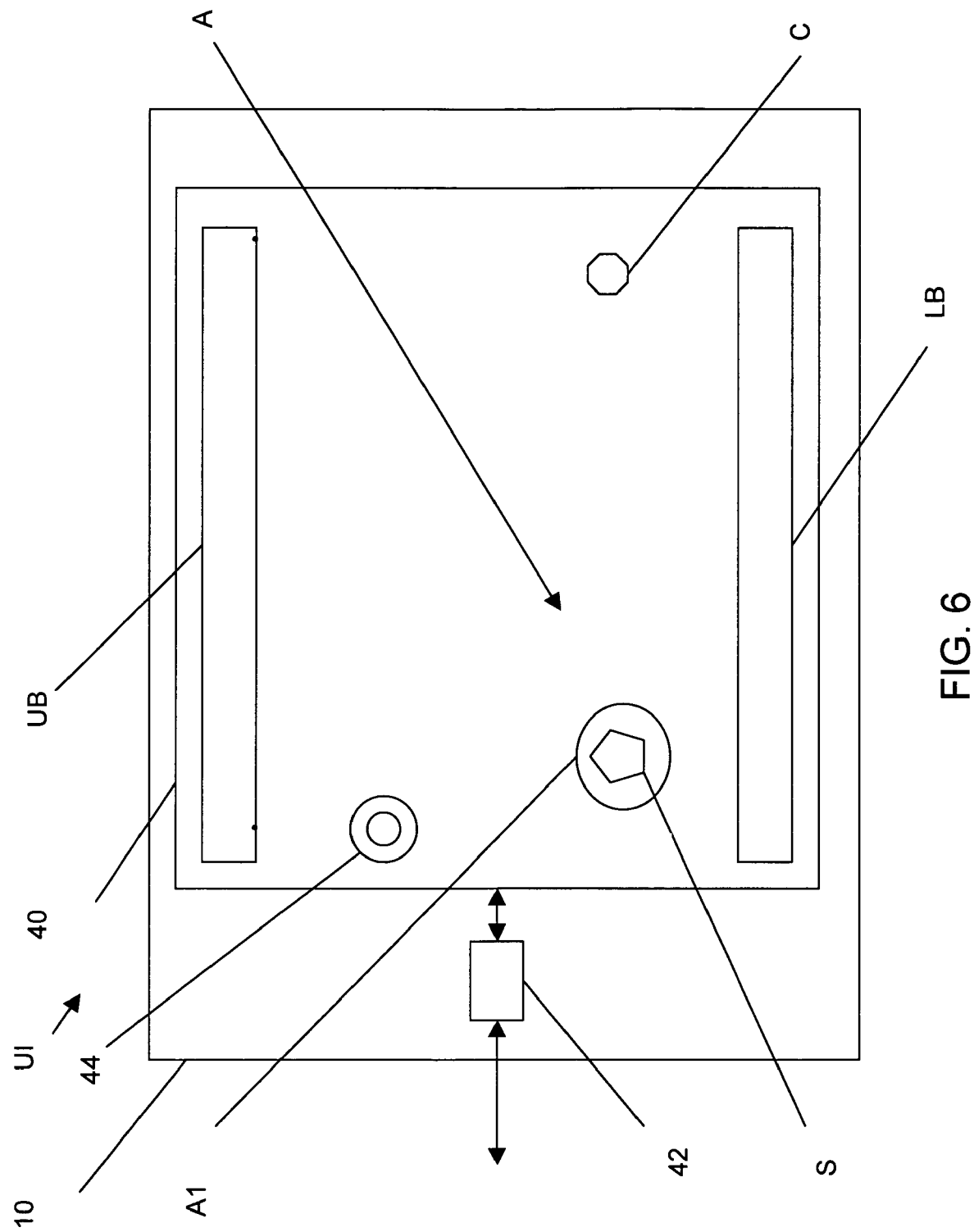
FIG. 6 is a representation of the a user interface generated in accordance with the first method of FIG. 3 and executed by means of the computer of FIG. 1 and/or the electronic communications network of FIG. 2, wherein an enclosing icon is presented in a first enclosing state.
Figure 7:
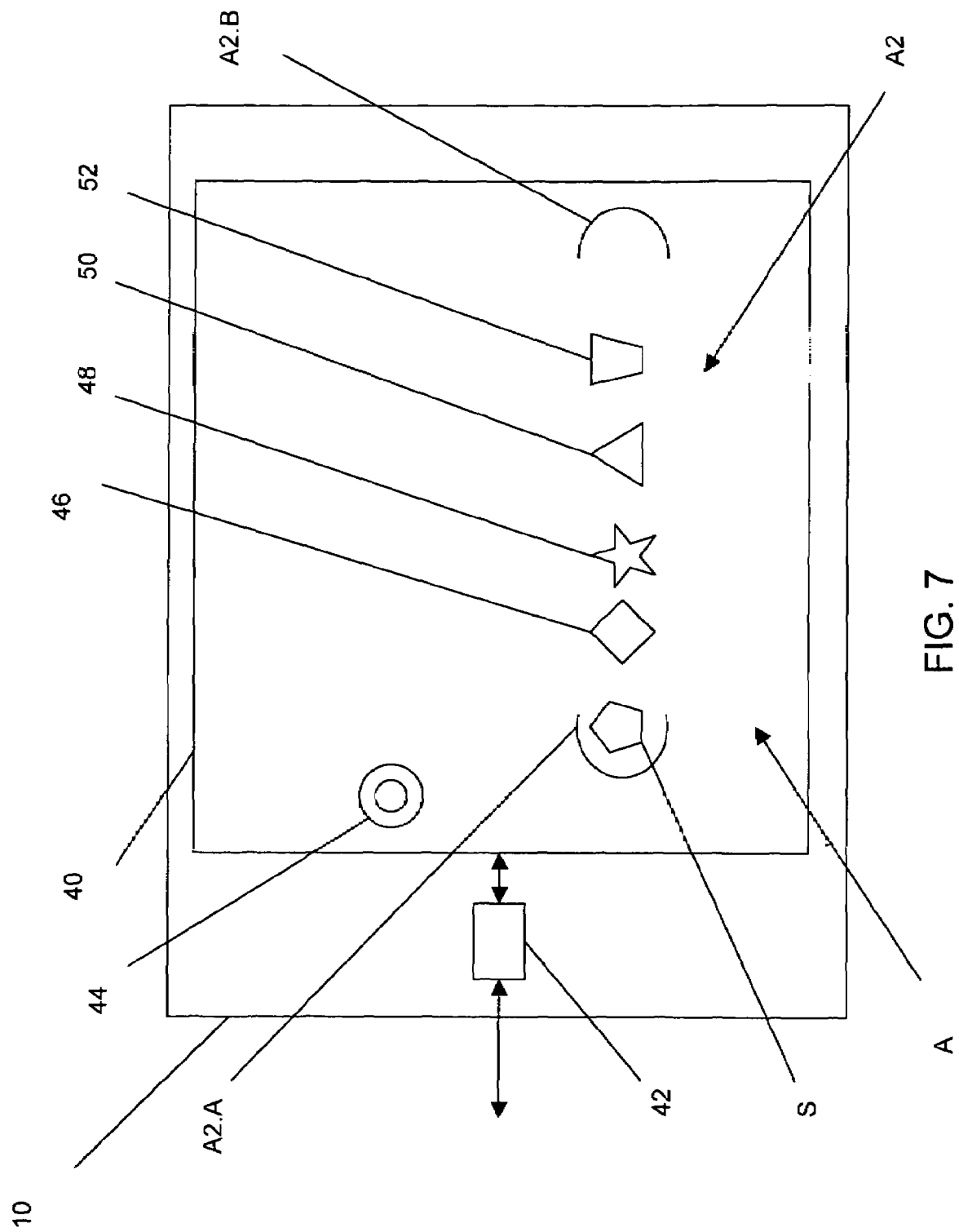
FIG. 7 is a representation of the user interface of FIG. 6 generated in accordance with the first method of FIG. 3 and executed by means of the computer of FIG. 1 and/or the electronic communications network of FIG. 2, wherein the enclosing icon of FIG. 6 is presented in a second, or presenting, state.

Referring now generally to the Figures and particularly to FIGS. 3, 6, 7, FIG. 6 illustrates an enclosing icon A shown in an enclosing state A1, whereas FIG. 7 illustrates the enclosing icon in a presenting state A2. FIG. 3 is a flow chart of the first method, wherein the enclosing icon A alternates between the enclosing state A1 and the presenting state A2, that may be executed by means of the electronic communications network 30 of Fig. In step 3.0 the computer 2 is powered up. In step 3.1 the computer 2 renders the enclosing icon A in the first enclosing state A1. In the loop 3.2-3.4 the computer 2 determines whether the enclosing icon A shall be rendered in the presenting state A2. In loop 3.5-3.7 computer 2 determines whether the enclosing icon A shall be rendered in the enclosing state A1. In step 3.8 the computer 2 determines whether a process icon 44-52 (see FIG. 7) has been selected by the user by means of the point and select device 20. It is understood that the computer 2 may be presenting the icon A in the enclosing state A1, with no process icons 44-52 presented, when the computer executes step 3.8; in these instances of the first method the computer 2 proceeds from step 3.8 onto step 3.10. When the computer 2 determines in step 3.8 that a process icon 44-52 has been selected by the user, the computer 2 proceeds on in step 3.9 to initiate the execution, or a session of, an information technology process associated with the process icon 44-52 determined in step 3.8 to have been selected. In step 3.10 the computer 2 determines whether the computer 2 shall continue to determine whether the enclosing icon A shall be maintained as rendered in a current state A1 or A2, or alternatively rendered in an alternate state A1 or A2.

Figure 4:
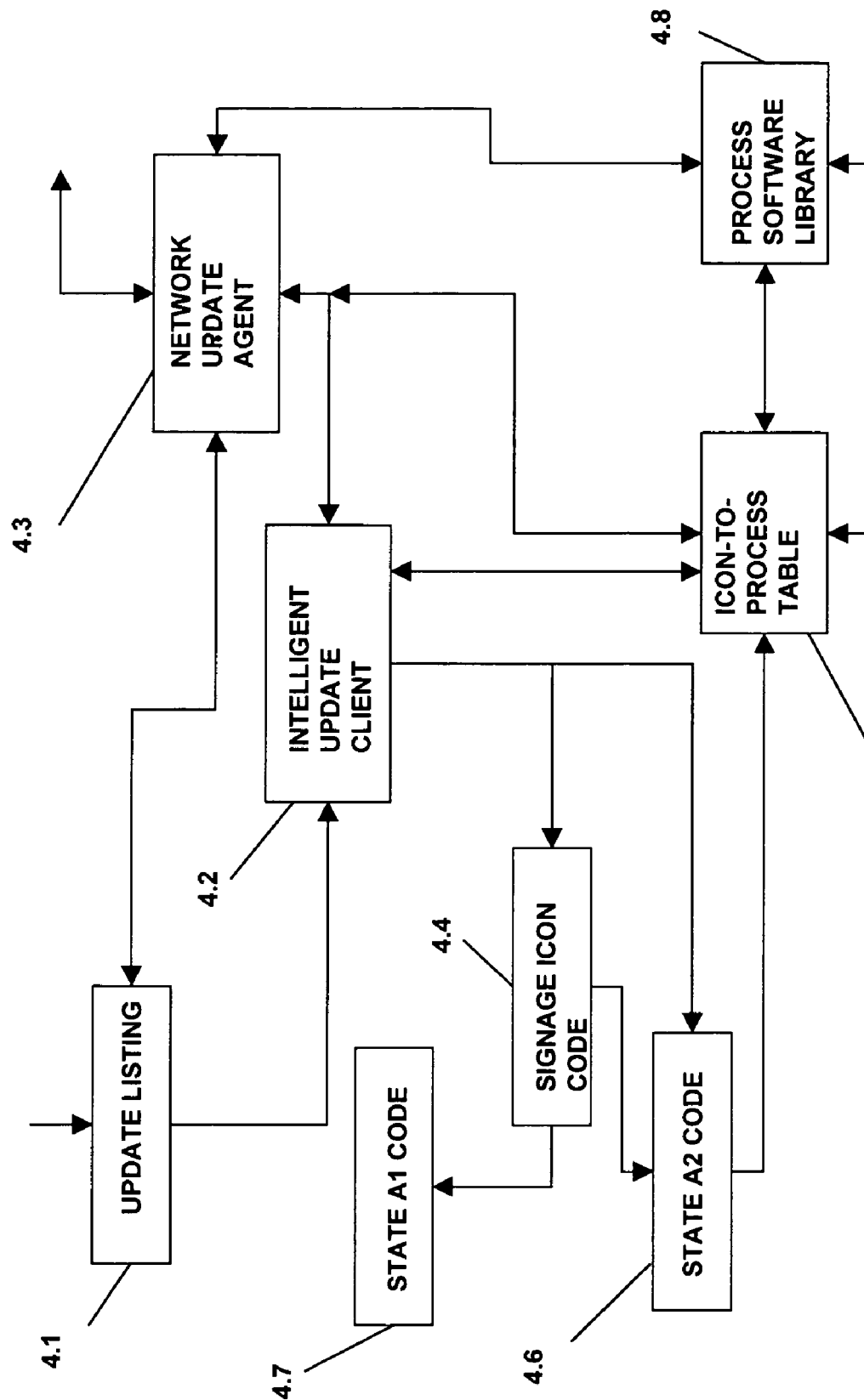
FIG. 4 is an entity diagram illustrating the relationships maintained among certain software modules 4.1-4.8 designed in accordance with the first method of FIG. 3 and that may be instantiated by means of the electronic communications network of FIG. 2.

Referring now generally to the Figures and particularly to FIG. 4, FIG. 4 is an entity diagram illustrating the relationships maintained among certain software modules 4.1-4.8 stored within the computer 2 and designed in accordance with the first method of FIG. 3, and that may be instantiated by means of the electronic communications network of FIG. 2. An update listing module 4.1 receives and stores information originated from the media 22, the communications network 30, the text entry device 14, and/or the point and select device 20 that is to be integrated into the process of the first method. An intelligent update client 4.2 receives information from the update listing module 4.1 and provides update information to a network update module 4.3, an icon-to-process table 4.4, to a signage icon software 4.5, and/or to a second state A2 code 4.6 of the enclosing icon A. Examples of update information might include personalized information that is added to the signage icon software 4.5, or the introduction of a new process icon 44-52 into the presenting state A2 software code.

The network update software agent 4.3 is configured to inform other elements of the communications network 30, e.g., the first server 32 and the second server 36, of information received by the update listing software module 4.1.

The second present state A2 code 4.6 comprises machine readable software encoded instructions that enable the computer 2 to render the second presenting state A2 of the enclosing icon A, whereas a first enclosing state A1 code 4.7 comprises machine readable software encoded instructions that enable the computer 2 to render the first enclosing state A1 of the enclosing icon A. A process software library 4.8 includes a plurality of computer-readable instruction sets, e.g., software programs, that enable the computer 2 to initiate an information technology process associated with each process icon 44-52. The icon-to-process table 4.4 associates each process icon 44-52 with at least one of the computer-readable instruction sets that may be used by the computer 2 to execute, run, request, or initiate a session of an information technology process.

Figure 5:
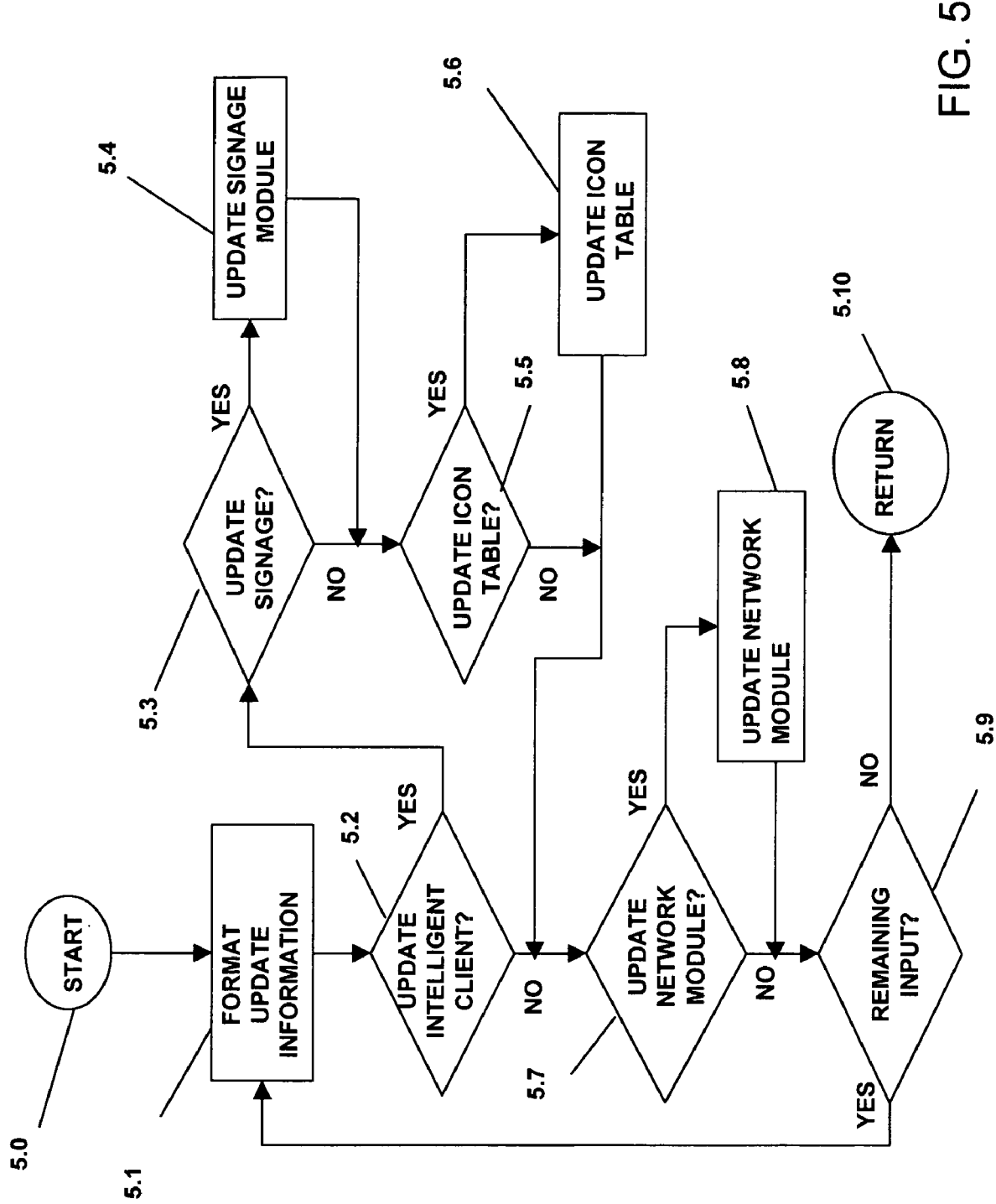
FIG. 5 is a flow chart of the interactivity of the software modules of FIG. 4.

Referring now generally to the Figures and particularly to FIG. 5, FIG. 5 is a flow chart of the interactivity of the software modules 4.1-4.8 of FIG. 4. In step 5.0 information is received by the update listing module 4.1. In step 5.1 the information received in step 5.0 is formatted for use by one or more of the entities 4.1-4.8. In step 5.2 the computer 2 determines whether any of the information formatted in step 5.1 shall be integrated by the intelligent update client 4.2. In step 5.3 the computer 2 determines whether any information received by the intelligent update client 4.2 shall be used by or integrated into, the signage icon module 4.5, and in step 5.4 information is used by or integrated into the signage icon module 4.5, whereby the rendering of the signage S within the user interface UI may be affected.

In step 5.5 the computer 2 determines whether any information received by the intelligent update client 4.2 shall be used by, or integrated into, the icon-to-process table 4.4, and in step 5.6 information is used by integrated into the icon-to-process table 4.4, whereby the association of one or more process icons 44-52 with one or more computer-readable instruction sets of the process software library 4.8 may be affected.

In step 5.7 the computer 2 determines whether any information received by the intelligent update client 4.2 shall be used by, or integrated into, the network update software agent 4.3, and in step 5.8 information is used by, or integrated into, the intelligent update client 4.2, whereby the interactivity of the computer 2 and the electronics communications network 30 may be affected.

Referring now generally to the Figures and particularly to FIG. 6, FIG. 6 is a representation of a graphical user interface UI generated in accordance with the first method of FIG. 3 and executed by means of the electronic communications network 30 of FIG. 2, wherein an enclosing icon A is presented in a first enclosing state A1. The display device 10 includes a display screen 40 and a display logic 42, or display interface circuit 42. The display interface circuit 42 is communicatively coupled with the internal communications bus 4 of the computer 2 and provides information received from the computer 2 and to the display screen 40 to enable the display screen 40 to visually present the user interface UI. Where the display screen 40 is a touch screen, the display interface circuit 42 accepts pressure sensing information from the display screen 40 and provides the received pressure sensing information to the internal communications bus 4 for evaluation and computation by the CPU 6.

Referring now generally to the Figures and particularly to FIGS. 1, 5, 6 and 7, the CPU 6, the memory 8, the internal communications bus 4, and the display device 10 are comprised within a system logic 43, the system logic 43 configured to visually present icons 44-52 (as per FIG. 7) associated with unique software programs stored within, or accessible by, the computer 2.

Referring now generally to the Figures, and particularly to FIGS. 6 and 7, the cursor C is positioned in accordance with positioning and movement information transmitted from the point and select device 20 via the internal communications interface 4 and to the display device 10, optionally in accordance with commands or additional information provided by the CPU 6 to the display device 10. When the cursor C is positioned over the enclosing icon A in the first enclosing state A1 and a select command is generated by the user via the point and select device 20, e.g., by depressing a button on a computer mouse of the point and select device 20, the computer 2 will direct the display device 10 to cease visually presenting the enclosing icon A in the first enclosing state A1, and to initiate displaying the enclosing icon A in a second state A2, or present state A2, as discussed below in reference to FIG. 7.

An information technology process icon 44, or process icon 44, is also provided by the computer 2 and within the user interface UI. An information technology process related to the process icon 44 is initiated, executed or run when the user selects the process icon 44 by placing the cursor C over the process icon 44 and depressing, clicking, or double clicking, a select feature, such as a select button, on the point and select device 10. Where the point and select device 20 is or comprises a computer mouse, the user shifts the position of the cursor within the user interface UI by manipulating the computer mouse along a substantively planar two dimensional surface, e.g., a mouse pad.

An upper band UB and a lower band LB of the user interface UI may further comprise or present a plurality of process icons 44, each process icon 44 associated with a unique information technology process, such as a software program, a web based service, and/or an Internet based service.

Software enabling the functionality of the enclosing icon A as described herein may be stored within the computer 2 and/or made available to the computer 2 by means of the electronic communications network 30. In the first enclosing state A1 a signage S is visually presented with the enclosing icon A. The signage S may be associated with an entity, such as a corporation. The term "corporation" is defined herein to include a person, a partnership, an association of persons or corporations, a team, a sports team, a political party, an ethnicity, a nation, a legally recognized corporation, and/or an idea.

Referring now generally to the Figures and particularly to FIG. 7, FIG. 7 is a representation of the user interface UI of FIG. 6 generated in accordance with the first method of FIG. 3 and executed by means of the electronic communications network 30 of FIG. 2, wherein the enclosing icon A is presented in a second state A2 (hereafter "presenting state" A2). The presenting state A2 visually presents the signage S, a first shell half A2.A, a plurality of process icons 46-52, and a second shell half A2.B.

The shell halves A2.A & A2.B provide a visual context to the paradigm that the enclosing icon A provides a location in the user interface UI where plurality of presented process icons 46-52 reside or can be easily located. The user may direct the computer 2 to change the state of the enclosing icon A from the presenting state A2 to the enclosing state A1 by manipulating the point and select device 10 to position the cursor C over the signage S or either shall half A2.A & A2.B and actuating a select feature on the point and select device 10, e.g., by clicking a mouse button.

Alternatively, the user may direct the computer 2 to initiate an information technology process associated with any one of the plurality of the presented process icons 46-52 by manipulating the point and select device 10 to position the cursor C over a selected presented process icon 46-52 and then actuating a select feature on the point and select device 10.

A first presented process icon 46 is associated with a first information technology process, where the first information technology process is instantiated by a first software program that is stored within the computer 2. User selection of the first process icon 46 directs the computer 2 to launch the associated first software program and make the first information technology process available to the user. Examples of functionalities that might be provided by the first information technology process include a word processor program, an electronic calendar program, a database, an educational program, and a game program.

A second presented process icon 48 is associated with a second information technology process, where the second information technology process is instantiated by a second software program that is stored partially within the computer 2 and partially within the first server 32. User selection of the second process icon 48 directs the computer 2 to launch, or initiate an execution or a session, of the associated second software program. Examples of functionalities that might be provided by the second information technology process include a network distributed game suite, a web-based email client and server pair, or a calendar accessible for updating by multiple parties.

A third presented process icon 50 is associated with a third information technology process, where the third information technology process is instantiated by a third software program that is stored partially within the computer 2 and partially within the media 22. User selection of the third presented process icon 50 directs the computer 2 to launch, or initiate an execution or a session, of the associated third software program. Examples of functionalities that might be provided by the third information technology process include an applications process that requires information readable from the media 22, such as a database, an encryption key, an account designator, a user identification, a password, and/or a permission.

A fourth presented process icon 52 is associated with a fourth information technology process, where the fourth information technology process is instantiated by a web browser software program that is stored wholly within the computer 2. User selection of the fourth presented process icon 52 directs the computer 2 to launch, or initiate an execution or a session, the web browser software program.

Figure 8:
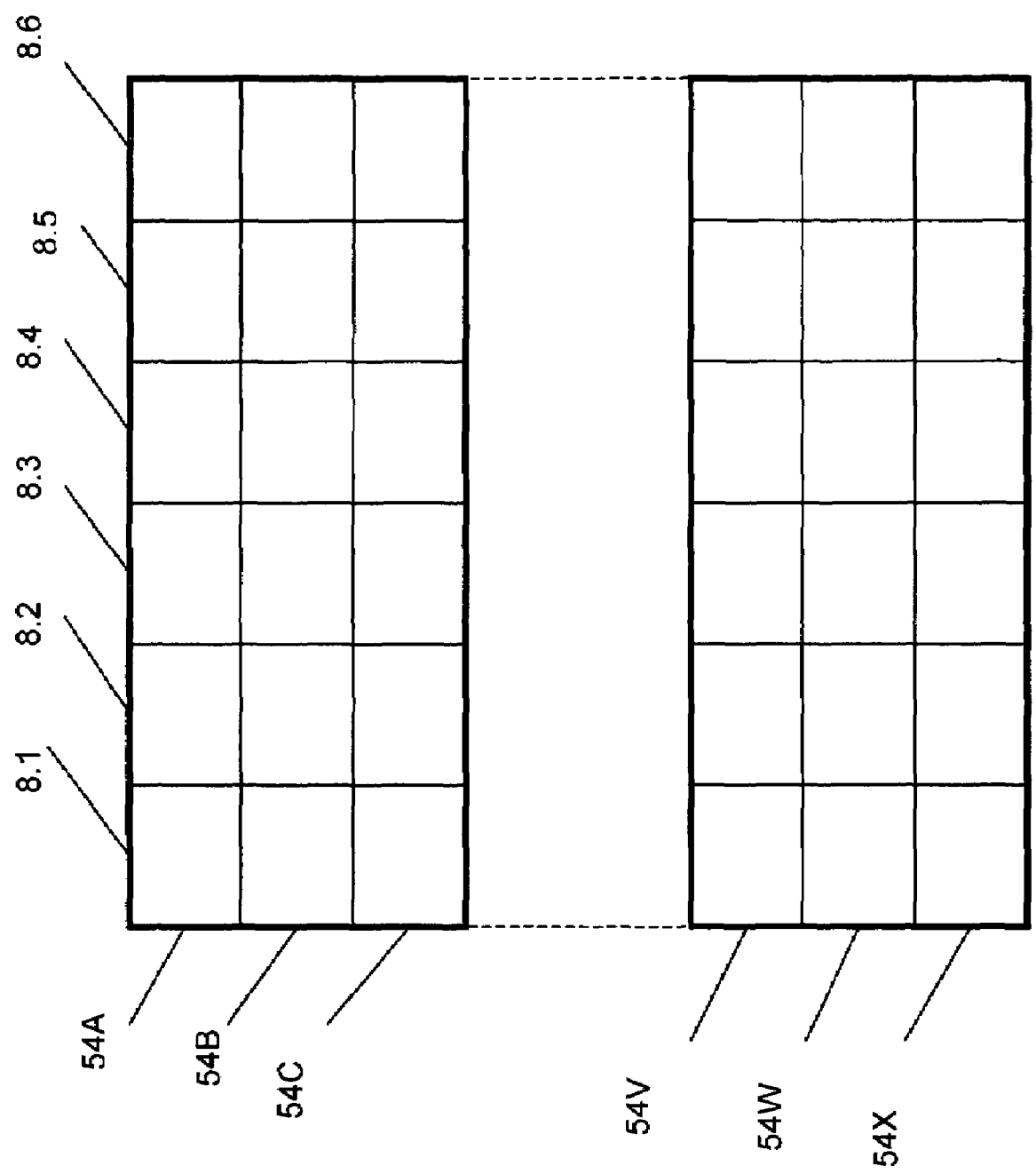
FIG. 8 is an illustration of a plurality of data records used by the computer of FIG. 2 to generate a plurality of enclosing icons of FIGS. 6 and 9.

Referring now generally to the Figures and particularly to FIG. 8, FIG. 8 is a schematic diagram of a plurality of enclosing icon data records 54A-54X, wherein each enclosing icon data record 54A-54X includes information useful to the computer 2 in instantiating one or more enclosing icons A-X. The plurality of enclosing icon data records 54A-54X may be stored in the memory 8 of the computer system 2. Each enclosing data record 54A-54X includes an identification data field 8.1, a name data field 8.2, a visual image data field 8.3, a password data field 8.4, a process icon data field 8.5, and a user profile data field 8.6. The identification data field 8.1 contains a unique identifier of the instant enclosing icon data record 54A-54X. The remaining enclosing icon data fields 8.2-8.6 contain data that is associated with a single enclosing icon A-X associated with the unique identifier of the identification data field 8.1, wherein each enclosing data record 54A-54X is separately associated in a one-to-one correspondence with a single enclosing icon A-X. The name data field 8.2 contains a name associated with the enclosing icon data record 54A-54X that is associated with the identifier of the identification data field 8.1 of the same enclosing data record 54A-54X, wherein the name may be visually presented on the display screen 40 of the computer system 2. The visual image data field 8.3 contains data used by the computer to display the enclosing icon A-X that is associated with the instant enclosing icon data record 54A-54X, to include two or more states of the enclosing icon A-X. The password data field 8.4 includes a password that may be necessary for a user to provide in order to execute the associated enclosing icon A-X. The process icon data field 8.5 contains data used by the computer system 2 to display one or more process icons 44-52 that are associated with the instant enclosing icon data record 54A-54X. The user profile data field 8.6 contains information related to one or more users of the computer system 2, such as credit card account information, or authorization to use processes or services of the computer system 2.

Figure 9:
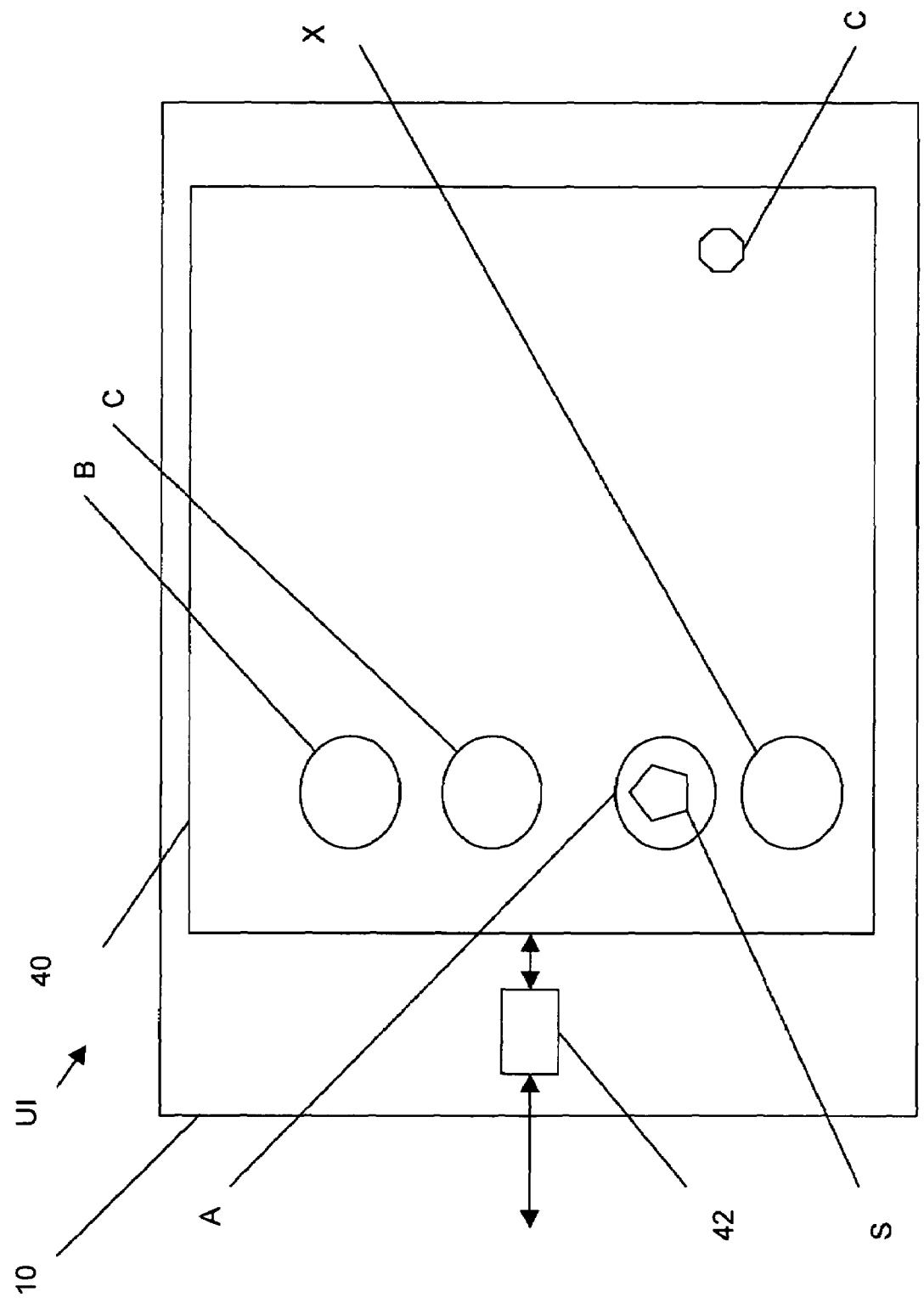
FIG. 9 is an illustration of the display screen of FIG. 1 displaying a plurality of process icons of FIG. 6.

Referring now generally to the Figures and particularly to FIG. 9, FIG. 9 is an illustration of the display screen 40 showing a plurality of enclosing icons A-X, wherein each enclosing icon A-X may present in the enclosing state A1 or the presenting state A2. One or more users may use the point and select device 20 to direct the computer system 2 to display each icon A-X in either state A1 or A2. The enclosing icons A, B, C & X are illustrated in FIG. 9 in the enclosing sate A1, and it is understood that each enclosing icon record 54A-54X enables the computer system 2 to display the associated enclosing icon A-X in either the enclosing state A1 or the presenting state A2, and with a unique or and personalized signage S presented in either or both states A1 & A2.

Figure 10:
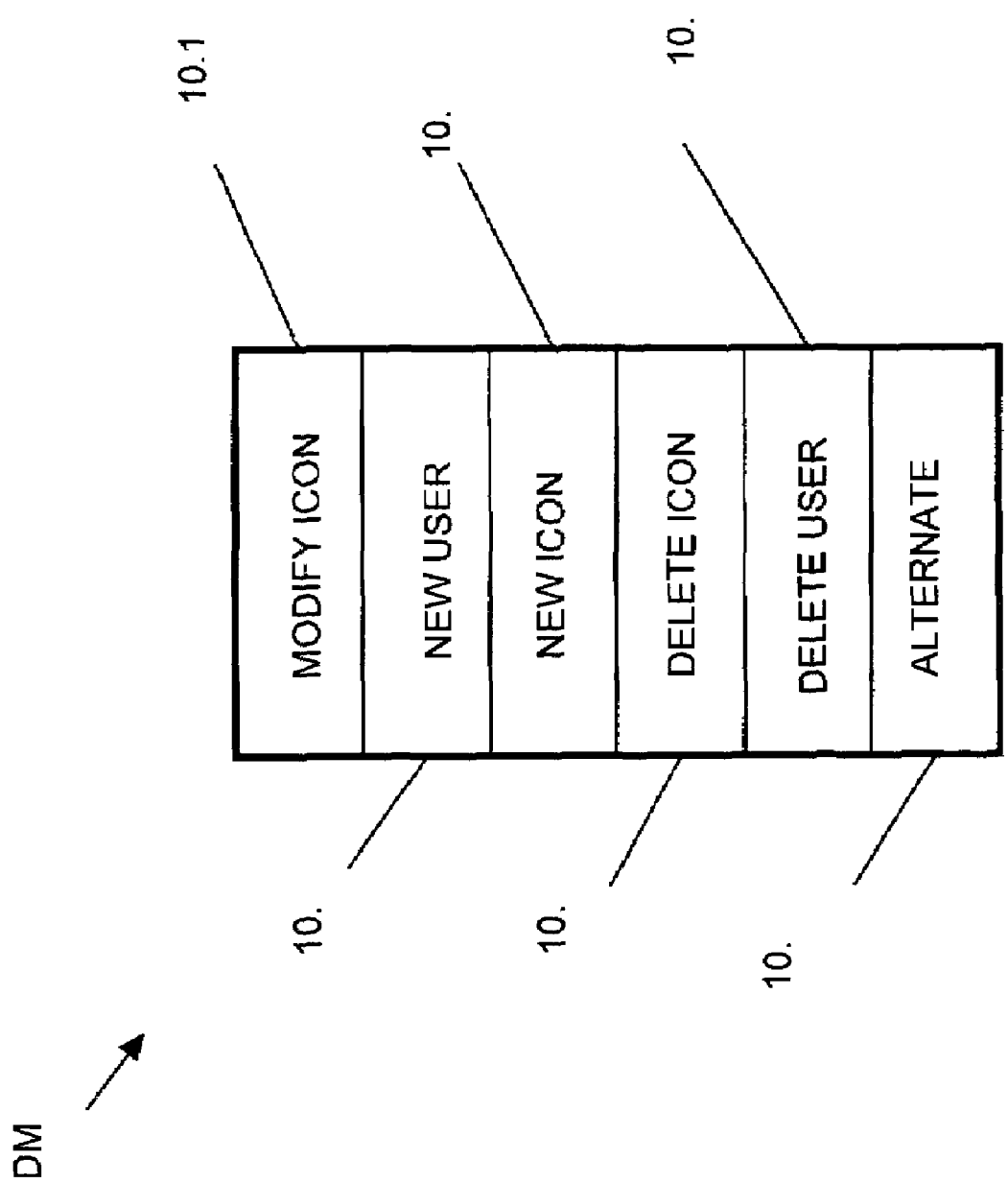
FIG. 10 is an illustration of an optional drop down menu of the first method of FIG. 3 and that my be generated by means of the computer of FIG. 1.

Referring now generally to the Figures and particularly to FIG. 10, FIG. 10 is an illustration of a drop down menu DM that may be presented on the display screen 20 upon a command issued by the user by means of the point and select device 20. In one embodiment, the user may use the point and select device to place the cursor C over the first enclosing icon A, or optionally any icon A-X, and then double-click a select button of the point and select button 20 to direct the computer system 20 to display the drop down menu DM. The user may then select a function 10.1-10.5 of the means of manipulating the point and select device 20 and a select feature of the point and select device 20. A first function 10.1 enables the user to edit and modify data stored or associated with an existing enclosing icon data record 54A-54X. A second function 10.2 enables the user to add a new user to be authorized to use an existing enclosing icon data record 54A-54X. A third function 8.3 enables the user to create a new enclosing icon data record 54A-54X for use by the computer 2 in generating an additional enclosing icon A-X. A fourth function 8.4 enables the user to direct the computer system 2 to delete an existing icon data record 54A-54X. A fifth function enables the user to delete a user from an existing enclosing icon data record 54A-54X, whereby an identified user may lose authorization by the computer system 2 to control the functionality of an icon A-X associated with an associated enclosing icon data record 54A-54X. A sixth functionality 10.6 is presented to clarify that the drop down menu DM may include additional suitable functionalities known in the art.

Figure 11:
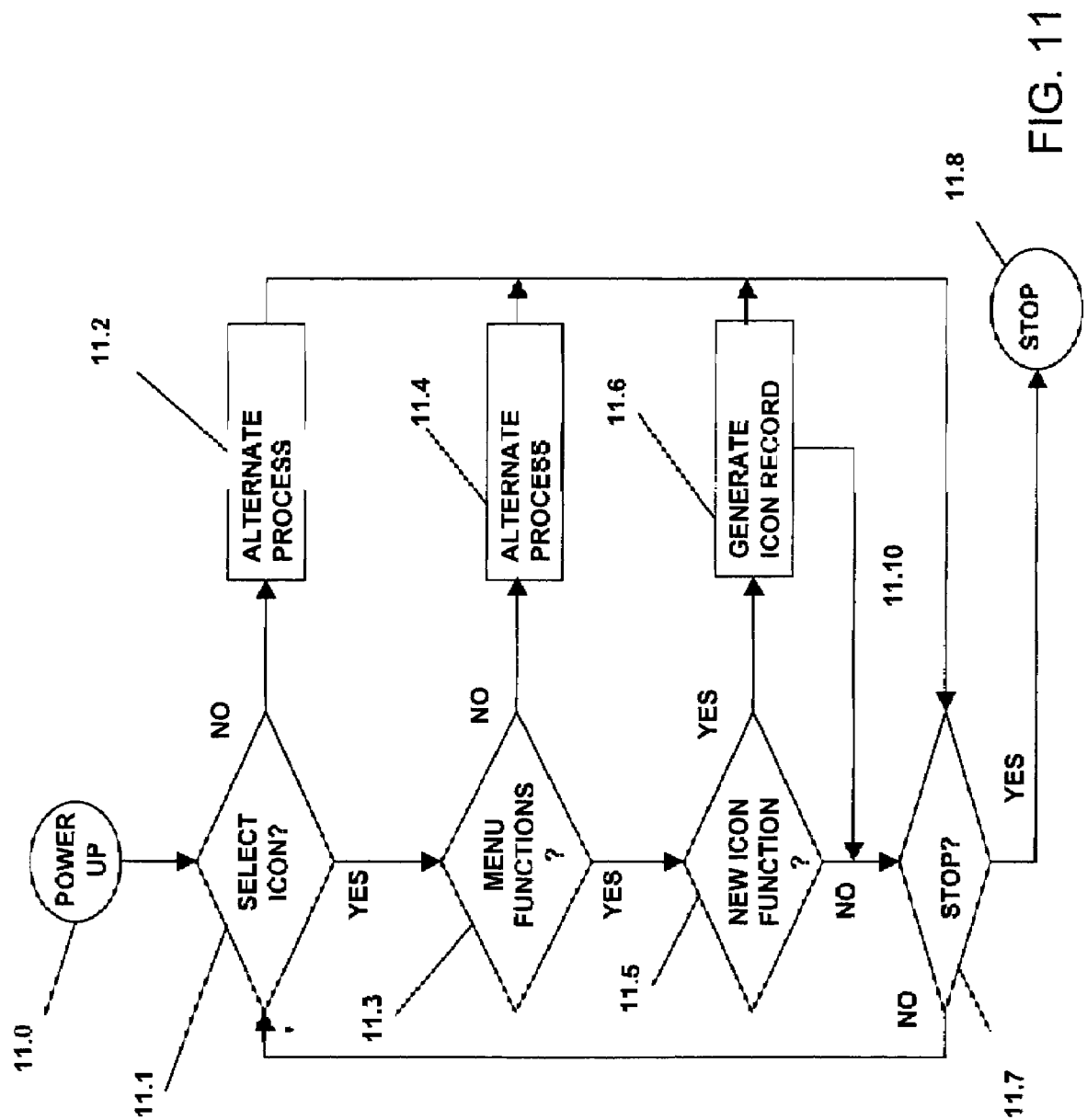
FIG. 11 is a flow chart of optional steps of the first method of FIG. 3.

Referring now generally to the Figures and particularly to FIG. 11, FIG. 11 is a flow chart of optional steps of the first method, wherein the computer system 2 may be directed by the user to create or modify an existing enclosing icon data record 54A-54X. In step 11.0 the computer system 2 is powered up and the computer system 2 consequently boots up and displays enclosing icons A-X. In step 11.1 the computer system 2 determines whether the user has selected an enclosing icon A-X by means of the point and select device 20. In step 11.2 the computer system 2 may execute an alternate process. In step 11.3 the computer system 2 determines whether the user has directed the computer system 2 by means of the point and click device 20 to display the icon drop down menu DM. In step 11.4 the computer system may proceed on to execute an alternate process. In step 11.5 the computer system 2 may execute an alternate process. In step 11.3 the computer system 2 determines whether the user has directed the computer system 2 by means of the point and click device 20 to enable the third function 10.3 of the drop down menu DM, whereby a new enclosing icon data record 54A-54X may be generated. In step 11.6 the computer interacts with the user to generate a new enclosing data record 54A-54X, as per FIG. 12. In step 11.7 the computer system determines whether to proceed back to step 11.1 or to power down in step 11.8.

Figure 12:
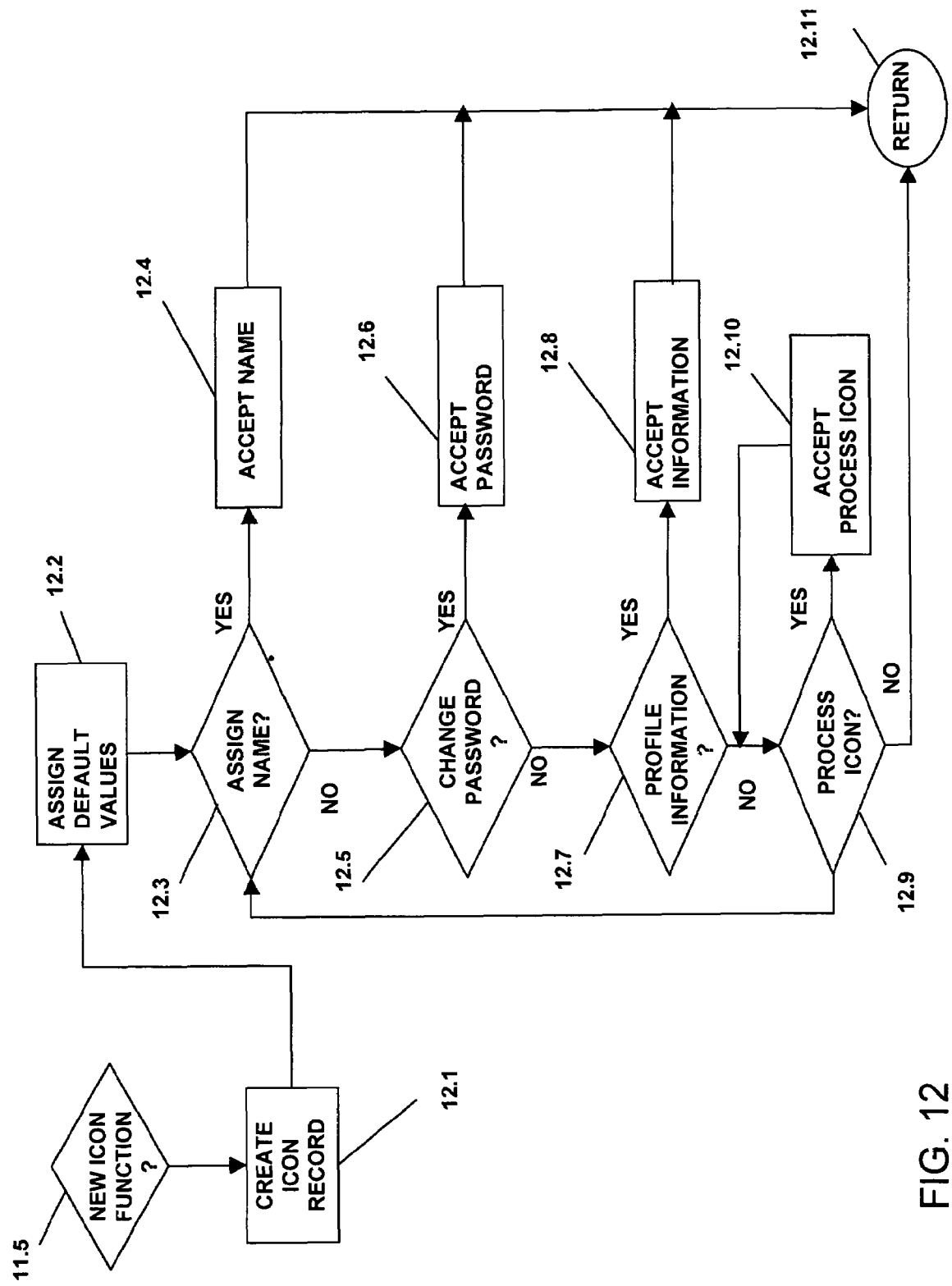
FIG. 12 is a flow chart of optional steps of the first method of FIG. 3 and the process of FIG. 11.

Referring now generally to the Figures and particularly to FIG. 12, FIG. 12 is a flow chart of optional steps of the first method of FIG. 6 and optional steps of FIG. 11, wherein the computer system 2 may be directed by the user to create or modify an existing enclosing icon data record 54A-54X. Steps 12.1 through 12.11 may optionally be included within the step 11.6 of the software process described in FIG. 11. The computer 2 may, as directed by the user, move from step 11.5 to step 12.1, wherein a new enclosing data record 54A-54X is generated by the computers system 2. In step 12.2 the computer system 2 may fill the data fields 8.1-8.6 of the new enclosing icon data record 54A-54X. In step 12.3 the computer system 2 determines whether the user is inputting a name to be associated with the new enclosing icon data record 54A-54X. In step 12.4 the computer system 2 writes the name information received from the user into the name data field 8.2 of the new enclosing icon data record.

In step 12.5 the computer system 2 determines whether the user is inputting a password to be associated with the new enclosing icon data record 54A-54X. In step 12.6 the computer system 2 writes the name information received from the user into the password data field 8.4 of the new enclosing icon data record 54A-54X.

In step 12.7 the computer system 2 determines whether the user is inputting other information to be associated with the new enclosing icon data record 54A-54X. In step 12.8 the computer system 2 writes the name information received from the user into the visual data field 8.3 and/or the profile data field 8.6 of the new enclosing icon data record 54A-54X. Information provided by the user and written into the visual data field 8.3 in step 12.8 may include image information that is displayed in the first enclosing sate A1 and/or the second presenting state A2 of the instant and associated enclosing icon A-X. In addition, information provided by the user and written into the profile data field 8.6 in step 12.8 may include image information that is displayed in the first enclosing sate A1 and/or the second presenting state A2 of the instant and associated enclosing icon A-X.

In step 12.9 the computer system 2 determines whether the user is directing the computer system 2 to include process icon identifiers, and optionally, other information related to selected process icons 44-52. In step 12.10 the computer system 2 writes information into process icon data field 8.5 of the new enclosing icon data record 54A-54X, wherein the information written into the process icon data field is accessed by the computer system 2 to display one or more associated process icons 44-52 when the enclosing icon A-X identified by information contained within the identification field 8.1 of the instant enclosing icon data record 54A-54X is in the presenting state A2.

Figure 13:
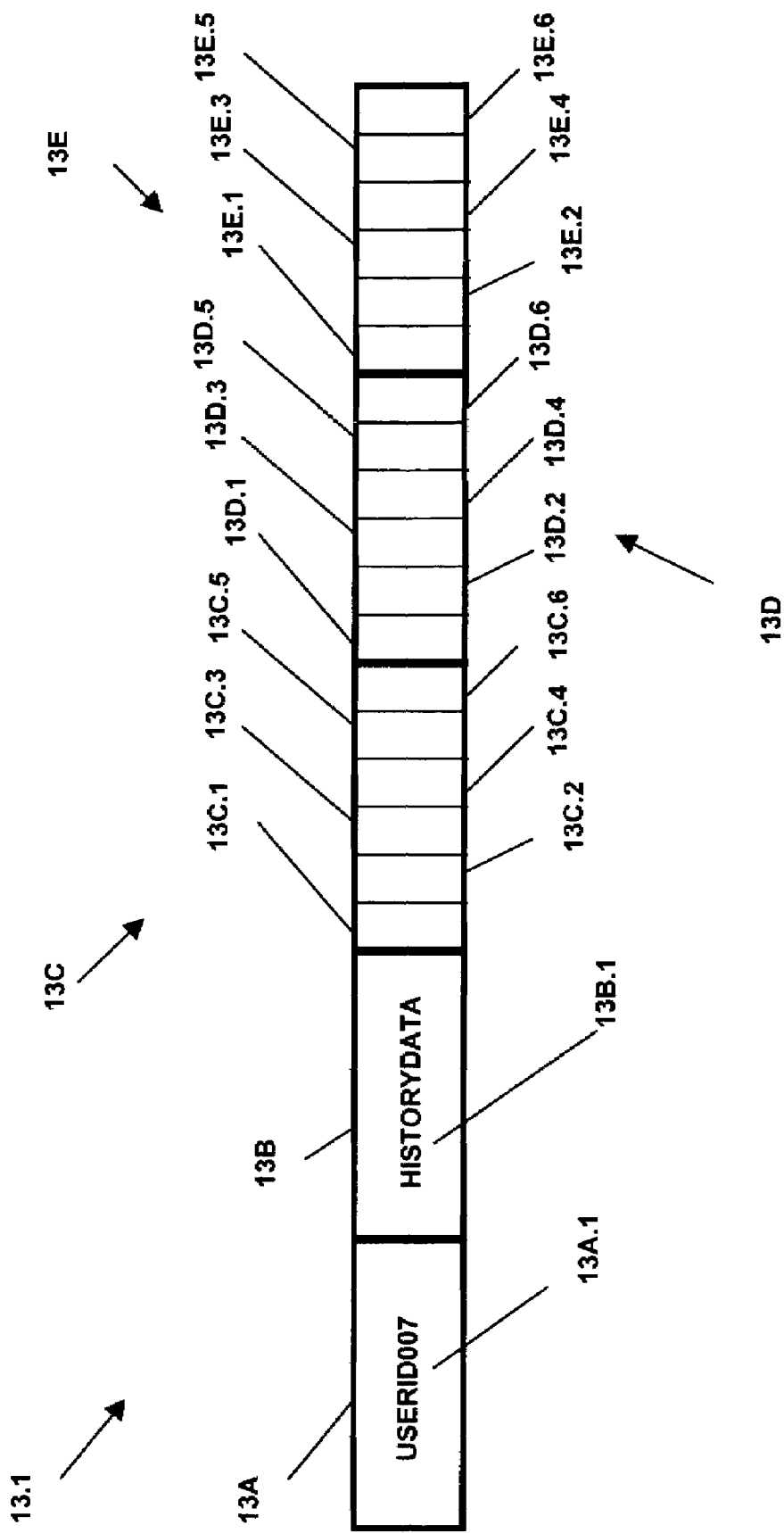
FIG. 13 is a schematic of an alternate preferred embodiment of the intelligent update client of FIG. 4.

Referring now generally to the Figures and particularly to FIG. 13, FIG. 13 is a schematic of a data structure names a user behavior record 13.1 of the intelligent update client 4.2 of FIG. 4. The intelligent update client 4.2, or intelligent client 4.2, uses the user behavior record 13.1 to maintain a-record of user interaction with the computer 2, to present suggestions to the user for modification of the associated enclosing icon data record to the user, to present suggestions to the user for modification of the operations of the computer 2, and to enable the application of suggestions as directed by the user. A client ID field 13A containers a user identifier 13A.1 that identifies a registered user associated with each separate user behavior record 13.1, and is used by the computer to assign an individual user record 13.1 to a specific enclosing icon data record 54A-54X in a one-to-one unique correspondence. A history field 13B stores history records 13B.1 of the user's activity with the computer 2. A behavior signature field 13C includes a plurality of behavior patterns 13C.1-13C.6 against which the interaction history of the user stored in the history filed 13B are occasionally compared; where a match is found between the history stored in the history field 13B and one or more behavior patterns 13C.1-13C.6, the intelligent client will query the user via the display device 10 whether to make a modification to the content of the enclosing icon data record 54A-54X associated with the instant user record 13.1, as described below in reference to FIG. 14. A query logic data field 13D comprise query instructions 13D.1-13D.6 that direct the computer 2 to present suggestions to the user for modifications to an enclosing icon record 54A-54X and other aspects of the computer 2 and to accept and interpret user responses to the presented queries. A modification logic data field 13E comprise modification instructions 13E.1-13E.6 that direct the computer 2 to implement the user responses to the suggestions as interpreted by the query instructions 13D.1-13D.6 of the query logic data field 13D.

Figure 14:
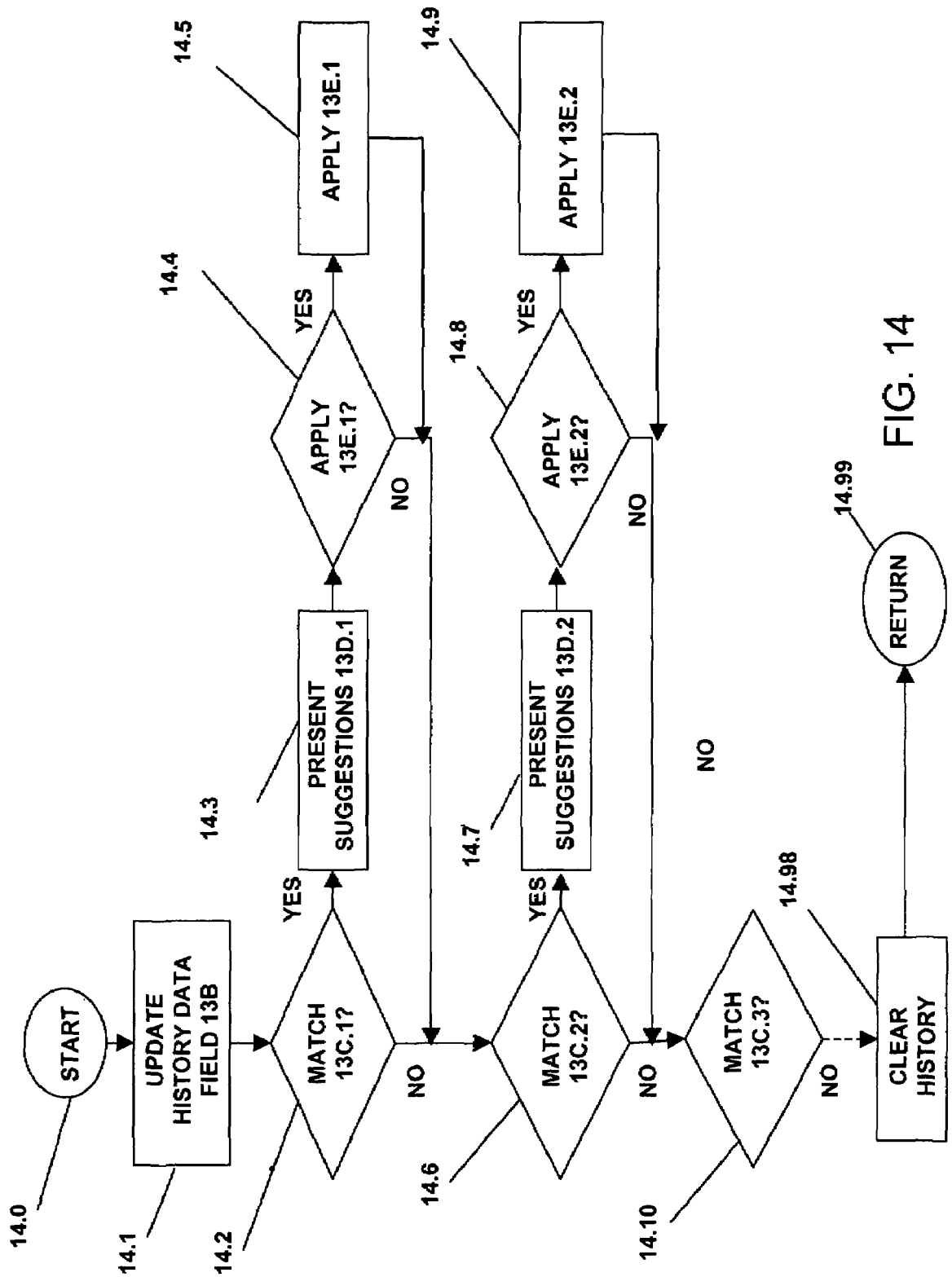
FIG. 14 is a flowchart of an interaction of the intelligent client of FIG. 13 with the user and in accordance with certain alternate preferred embodiments of the method of the present invention.

Referring now generally to the Figures and particularly to FIGS. 13 and 14, FIG. 14 is a flowchart of an interaction of the intelligent client 4.2 with the user that is comprised within certain other still additional alternate preferred embodiments of the method of the present invention. In step 14.1 the intelligent client 4.2 updates the history data field 13B of the user data record 13.1 associated with an individual enclosing data record 54A-54X. In step 14.2 the intelligent client 4.2 compares the informational contents of the history data field 13B with information stored in a first behavior signature data field 13C.1, whereby the computer 2 determines whether each individual process icon 44-52 referenced in the enclosing data record 54A-54X has been selected by the user within a certain period of time. For example, if the comparison of step 14.2 might determine whether the user has not selected a particular process icon presented by the enclosing icon A in the presenting state A2 within 30 days. The intelligent client 4.2 may then query the user in step 14.3 in accordance with a first query instructions 13D.1 whether that particular process icon 44-52 shall be deleted from the enclosing data record 54A-54X. Upon user direction as interpreted in step 14.4 and in accordance with the first query instructions 13D.1, the computer 2 deletes the process icon 44-52 from the enclosing data record 54A-54X in step 14.5 and in accordance with a first modification instructions 13E.1.

The computer then proceeds from steps 14.2, 14.3, 14.4 or 14.5 to step 14.6, wherein the computer 2 compares the informational contents of the history data field 13B with information stored in a second behavior signature data field 13C.2, whereby, for example, the computer 2 might determine whether an individual process icon 44-52 not referenced in the enclosing data record 54A-54X has been selected by the user repeatedly within a certain period of time. For example, if the user has selected a particular process icon 44-52, and one that is not presented by the enclosing icon A in the presenting state A2, more than ten times within the previous 48 hours, the intelligent client may the user in step 14.7 in accordance with a second query instructions 13D.2 whether that particular process icon 44-52 shall be added to the enclosing data record 54A-54X. Upon user direction as received and interpreted in step 13E.2 and in accordance with the second query instructions 13D.2, the computer 2 adds a reference to the frequently selected process icon 44-52 from the enclosing data record 54A-54X associated with the user ID 13A.1 in step 14.9 and in accordance with a second modification instructions 13E.2.

Computer 2 compares the informational contents of the history data field 13B with the information stored in a third through sixth behavior signature data fields 13C.3-13C.6 in executing steps 14.10 through 14.97, whereupon in step 14.98 the information stored in the history data field 13B that is aged later than a set time period, exemplary aged time periods including one hour, two days or six weeks, is deleted to free up writeable memory capacity in the history data field 13B. In step 14.99 the computer 2 return to performing other computational operations.

It is understood that the behavior signature data fields 13.1-13.6 may alternatively include suitable algorithms known in the art to compare user interaction with the computer 2 and or communications network 30. For example, an algorithm at least partially stored in a behavior signature data field 13C.1-13C.6 may be implemented by the intelligent client 4.2 to direct the computer 2 to suggest to the user that a certain process icon 44-52 be presented in the enclosing icon's A presenting state when an appropriate pattern of interaction is detected by the computer 2. In another example, the intelligent client 4.2 may direct the computer 2 to suggest an alternate web browser, or an updated version of a web browser. In another example, the intelligent client 4.2 may suggest a downloading from the communications network 30 of an update to a word processor software program, e.g. Microsoft's WORD™ word processing program. The intelligent client may alternatively or additionally suggest an uploading of a new software program, or an update of a software program, from an electronic media 22 by means of the electronic media reader 12, in response to the analysis of the informational content of the history data field 13B by application of an algorithm at least partially stored in a behavior signature data field 13C.1-13C.6. In another example, the computer 2 may suggest an acceptance of a process icon 44-52 related to a webservice as directed by the intelligent client 4.2.

Figure 15:
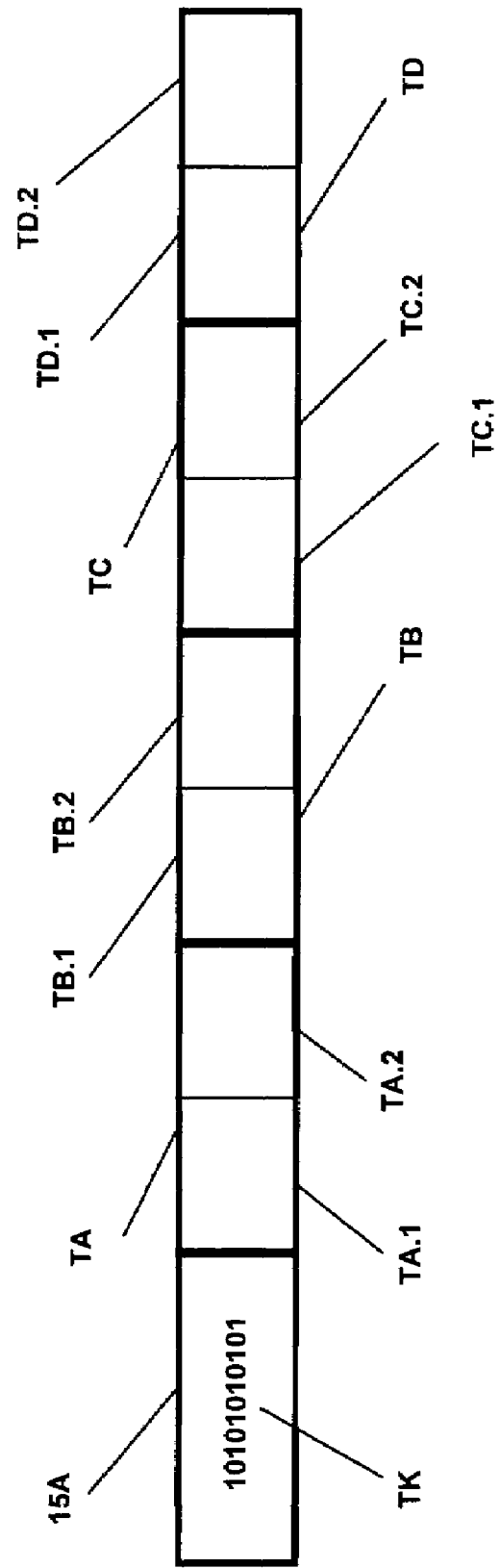
FIG. 15 presents a toolkit data structure of a software toolkit icon that is included in certain other still additional alternate preferred embodiments of the method of the present invention
Figure 16:
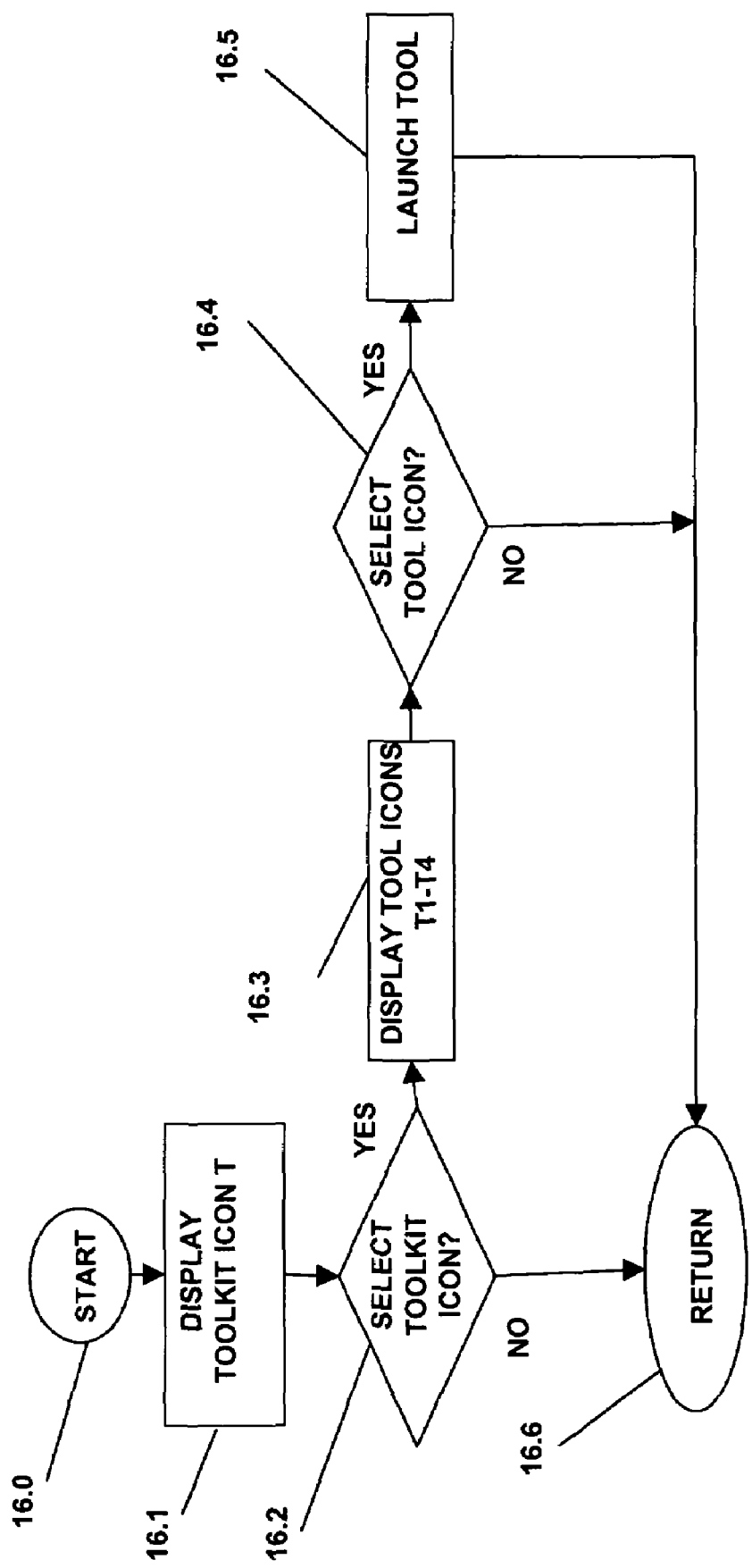
FIG. 16 is a flowchart of an interaction of and the computer of FIG. 1 with the user, and employing the toolkit data structure of FIG. 15 in accordance with certain alternate other preferred embodiments of the method of the present invention.

Referring now generally to the Figures and particularly to FIGS. 7, 15 and 16, FIG. 15 presents a toolkit data structure 15 of a software toolkit icon T that is included in certain still additional alternate preferred embodiments of the method of the present invention. The toolkit data structure 15 includes (1.) a toolkit identification data field 15A containing a toolkit icon information TK, and (2.) a plurality of tool data fields TA-TD. Each tool data field TA-TD is uniquely associated with an information technology process, such as a webservice or a software utility program. Machine-readable instructions that enable the computer 2 to launch, execute, initiate or run the related information technology process may be at least partially stored within the computer 2, or made available in whole or in part to the computer 2 via the communications network 30 or the media reader 12. Each tool data field TA-TD includes a tool icon data TA.1-TD.1 and a tool ID data TA.2-TD.2. Each tool icon data TA.1-TD.1 includes information that enables the computer to present an associated tool icon T1-T4 that is visually associable by the user with a software utility. Each tool icon T1-T4 is associated with a unique software program that is executable by reference to the tool ID data TA.2-TD.2 stored in the tool data field TA-TE of the toolkit data structure 15.

The toolkit icon information TK enables the computer 2 to visually present an icon T visually associable by the user with the function of providing access to a plurality of software utilities.

In practice, and as described now in particular reference to FIG. 16, the toolkit icon T is displayed in step 16.1 wherein the enclosing icon A is displayed in the presenting state A2. In step 16.2 the toolkit icon T may be selected and in step 16.3 the toolkit icon T is placed in a presenting state T.2 and the tool icons T1-T6 are displayed by the display screen 40. In step 16.4 a tool icon T1-T6 may be selected and in step 16.5 a utility software program, webservice, or other suitable information technology process known in the art and associated with a tool icon T1-T6 selected in step 16.4 is launched, instantiated, initiated or otherwise run or initiated.

Figure 17:
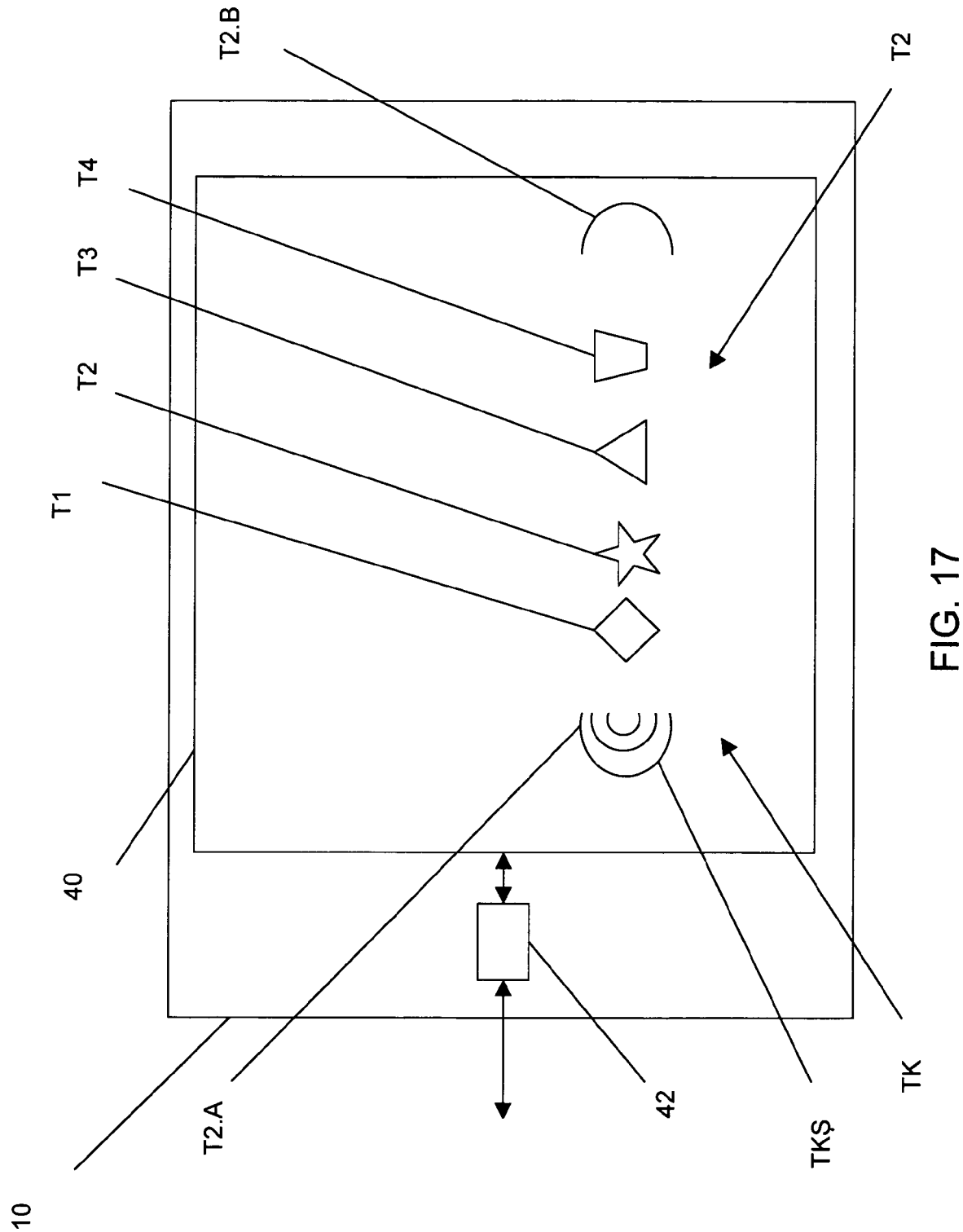
FIG. 17 is an illustration of the display screen of FIG. 16 displaying a toolkit icon and a plurality of tool icons of FIG. 6.

Referring now generally to the Figures and particularly to FIG. 17, the toolkit icon TK is displayed in a presenting state T2, and displaying state icons elements T2.A and T2.B and toll icons T1, T2, T3 & T4. A toolkit signage TKS visually identifies the presenting state T2 as an aspect of the toolkit TK to the user. The information stored in the toolkit data structure enables the computer 2 to generate the toolkit TK in both an enclosing state, a presenting state T2, as well as the tool icons T1-T4 and the toolkit signage TKS on the display screen 40.

Information technology processes that may be made available to the user by means of the toolkit icon T and the toolkit data structure 15 may provide one or more of the functions of (a.) desktop clean-up, (b.) clearing of historical records of web browsers and other software programs, (c.) clearing temporary files and documents, (d.) defragging operations of en electronic, magnetic or optical disk device.

Figure 18:
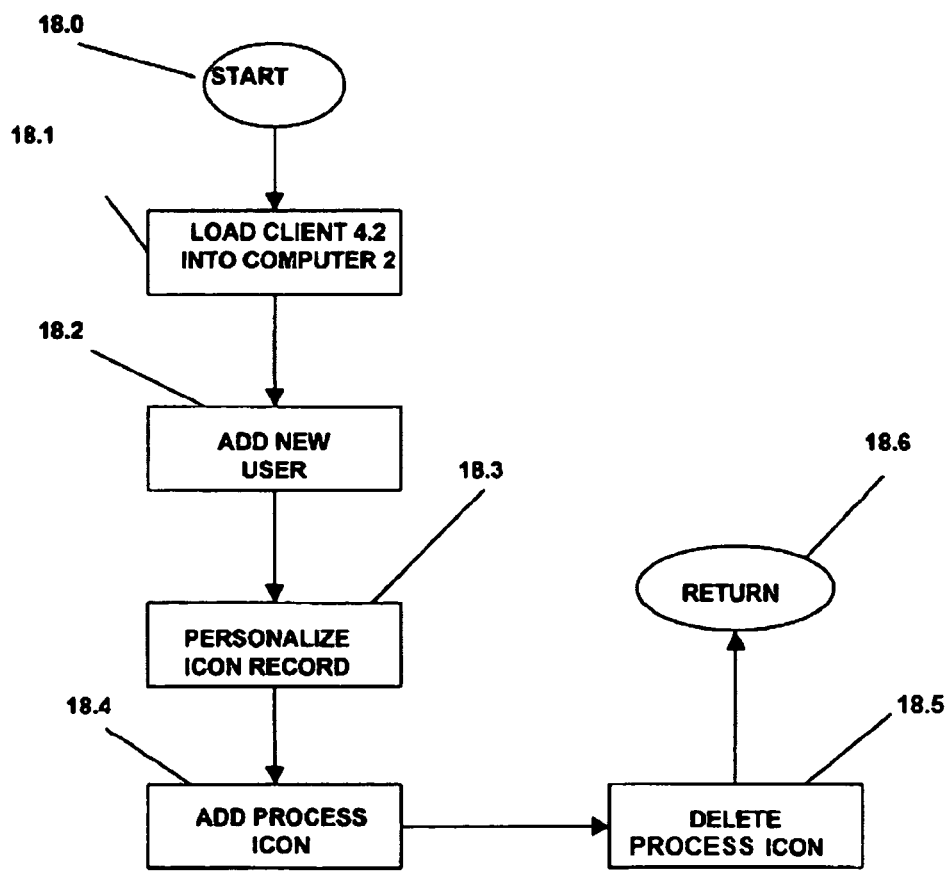
FIG. 18 is a flowchart of a second method that is in accordance with certain yet additional preferred embodiments of the method of the present invention.

Referring now generally to the Figures and particularly to FIG. 18, a yet additional preferred embodiment of the method of the present invention, or second method, is described. It is understood that one or more steps of the second method may be included with one or more steps or aspects of the first method in other various alternate preferred embodiments of the method of the present invention. In step 18.1 the intelligent client 4.2 is provided to the computer 2 by downloading from the communications network 30 or alternatively by uploading from the electronic media 22. In step 18.2 a new user is added and a new user icon record 54A-54X is generated. In step 18.3 personalized information, such as music data, passwords and shortcuts to selected information technology tools is added to a user icon record 54A-54X. In step 18.4 a process icon 44-52 may be newly associated with a selected enclosing icon A by selecting the enclosing icon A, placing the selected enclosing icon A into a presenting state A2, and dragging a process icon 44-52 onto the enclosing icon A and dropping the selected process icon 44-52 while the cursor C is over the enclosing icon A. In step 18.5 a process icon 44-52 may be deleted from an icon record 54A-54X by placing the enclosing icon into the presenting state A2, selecting the process icon 44-52 from enclosing icon A, dragging the selected process icon 44-52 away from the enclosing icon A and then dropping the selected process icon 44-52 while the cursor C is distal from the enclosing icon A.

Various operations of selecting, dragging and dropping enclosing icons A, process icons 44-52 and tool icons T, T1-T6, are enabled in certain various preferred alternate embodiments of the method of the present invention by manipulation the point and select device 20 that is coupled with or comprised within comprised within the computer 2.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible embodiments of the Present Invention. The examples given should only be interpreted as illustrations of some of the preferred embodiments of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the Present Invention as disclosed and claimed should, therefore, be determined with reference to the knowledge of one skilled in the art and in light of the disclosures presented above.

We claim:

1. A method for selectably presenting icons related to information technology processes by a user means of a computer system, the computer system having a memory, a display screen and a point and select device, comprising
   a. recording in the computer system of an association provided by a user of at least two information technology processes with an enclosing icon data record, each of the at least two information technology system associated with a distinct visual icon;
   b. rendering an enclosing icon on the display screen as derived from the enclosing icon data record as a result of the boot up process of the computer, the enclosing icon presenting a visually distinct signage, and the enclosing icon adapted for alternatively and selectable instantiating a first enclosing state and a presenting state;
   c. displaying the enclosing icon in the first enclosing state;
   d. receiving from the user a command to render the enclosing icon in the presenting state;
   e. rendering the enclosing icon in the presenting state and at least two process icons in an instantiation of a software code comprised within the memory of the computer system and upon selection of the enclosing icon by means of the point and select device, wherein each process icon is uniquely associated with one of the at least two information technology processes previously associated with the enclosing icon by the user and each process icon initiates a unique information technology process when selected by means of the point and select device;
   f. wherein the signage is visually associated with a corporation;
   g. wherein the signage of the enclosing icon includes personalized information associated with a user of the computational device, whereby the personalized information may be collected by an intelligent client executable by the computer system, and the computer systems automatically monitors interaction of the user with a computer and recommends to the user an addition or a deletion of a process icon associated with a one or more process icons on the basis of a comparison of the a record of the user's interaction with the computer system and digitized representations of computer interaction patterns.

2. The method of claim 1, further comprising displaying the enclosing icon in the enclosing state upon selection of the enclosing icon in the presenting state.

3. The method of claim 1, wherein the computer system further comprises a network interface bi-directionally communicatively coupled with an electronics communications network, the method further comprising receiving by the computer system a second software code from the electronic communications network, and rendering the second software code in the display of the presenting state of the enclosing icon.

4. The method of claim 1, wherein the signage of the enclosing icon is personalized.

5. The method of claim 1, further comprising initiating at least one information technology process upon selection of the associated process icon by means of the point and select device.

6. The method of claim 1, wherein the at least one information technology process is selected from the group of information technology processes that include a web based service, an Internet service, a web browser, a word processor, an address book, a calendar, an email client, and a visual image presenter.

7. The method of claim 1, further comprising:
   d. receiving an update information related to a unique informational technology process associated with at least one process icon;
   e. logging the update information in an update listing via an intelligent client executable by means of the computer system;
   f. associating the update listing with at least one process icon via the intelligent client executable; and
   g. displaying the associated process icon concurrently with the display of the enclosing icon in the presenting state.

8. The method of claim 7, further comprising executing at least one command associated with the update information after selection of the update information from the update listing.

9. The method of claim 8, further comprising generating a plurality of enclosing icons, each enclosing icon of the plurality of enclosing icons personalized to at least one user, whereby functionalities enabled by means of each enclosing icon of the plurality of enclosing icons may be unique.

10. An apparatus for enabling selection and initiation of information technology processes by a computer, the computer including a display and a point and select device with which a user selects an icon visually presented on the display, comprising:
   a. a memory that stores an enclosing icon software, a plurality of icon software and a plurality of application programs
   b. the enclosing icon software including signage information selected by a user, an enclosing state icon software, a presenting state icon software and at least two associations with separate information technology processes as selected by the user;
   c. each icon software associated in a one-to-one correspondence with an information technology process;
   d. a display logic coupled with the display, the display logic for rendering icons on the display, wherein at system start-up the display logic instantiates an enclosing state icon and renders a signage derived from the enclosing icon software, and upon selection of the enclosing state icon by the point and select device the display logic instantiates a presenting state icon and the signage derived from the enclosing icon software and a plurality of process icons derived from the plurality of icon software, wherein the display logic renders the plurality of process icons, the enclosing state icon, and the presenting state icon from software code comprised within the memory of the computer system
   e. wherein the signage is visually associated with a corporation;
   f. wherein the signage of the enclosing icon includes personalized information associated with a user of the computational device, whereby the personalized information may be collected by an intelligent client executable by the computer system, and the computer systems automatically monitors interaction of the user with a computer and recommends to the user an addition or a deletion of a process icon associated with a one or more process icons on the basis of a comparison of the a record of the user's interaction with the computer system and digitized representations of computer interaction patterns.

11. The apparatus of claim 10, wherein the display logic ceases instantiating the presenting state icon and the plurality of process icons upon selection of the presenting state icon by the point and select device.

12. The apparatus of claim 11, wherein the display logic instantiates the enclosing state icon upon selection of the presenting state icon by the point and select device.

13. The apparatus of claim 10, wherein the signage is an image related to a corporation.

14. The apparatus of claim 10, wherein the signage is visually associated with a computational device manufacturer.

15. The apparatus of claim 10, wherein the signage is personalized.

16. The apparatus of claim 15, wherein the signage includes personalized information associated with a user of the computational device.

17. The apparatus of claim 10, further comprising a system logic for initiating an associated information technology service upon selection of the associated process icon by the point and select device.

18. The apparatus of claim 17, wherein at least one associated application program is selected from the group of information technology processes that include a web based service, an Internet service, a web browser, a word processor, an address book, a calendar, an email client, and a visual image presenter.

19. The apparatus of claim 10, further comprising a system logic for:
   e. receiving an update information related to at least one information technology service, the at least one information technology process associated with one program or service icon;
   f. logging the update information in an update listing;
   g. associating the update listing with an update process icon; and
   h. displaying the update process icon concurrently with the display of the enclosing icon in the presenting state.

20. The apparatus of claim 19, wherein the system logic is further configured for executing at least one command associated with the update information upon selection of the update information from the update listing by the point and select device.

21. A computer readable medium selected from the group consisting of volatile and non-volatile media, and the computer readable medium comprising machine readable instructions which direct a computational device to implement the following procedures:
   a. generate a plurality of enclosing icons, wherein a first enclosing icon of the plurality of enclosing icons presenting presents a signage selected by a user, and each enclosing icon for alternatively and selectably instantiating a first enclosing state and a presenting state;

b. display the first enclosing icon in the enclosing state upon start up of the computational device and until the first enclosing icon is selected;
c. receive a command to cease a rendering of the first enclosing icon in the enclosing state and to display the first enclosing icon in the presenting state;
d. display the first enclosing icon in the presenting state and at least two process icons upon selection of the first enclosing icon, wherein each process icon is associated by the user with a unique information technology process initiated by machine-readable software encoded instructions stored on a same computer presenting the first enclosing icon, and the plurality of process icons, the enclosing icon, and the first presenting icon are rendered from software code comprised entirely within the memory of the computational device;
e. visually associate the signage of the first icon with a corporation;
f. associate the signage of the enclosing icon with personalized information associated with a user of the computational device;
g. provide an intelligent agent executable by the computer system that collects personalized information; and
h. monitoring interaction of the user with the computational device and recommends to the user an addition or a deletion of a process icon associated with a one or more process icons on the basis of a comparison of the a record of the user's interaction with the computer system and digitized representations of interaction of the user and the computer.

* * * * *